(12) United States Patent
Gannholm

(10) Patent No.: US 6,952,564 B2
(45) Date of Patent: Oct. 4, 2005

(54) METHOD AND ARRANGEMENT RELATING TO TRANSCEIVERS

(75) Inventor: Magnus Gannholm, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 799 days.

(21) Appl. No.: 09/888,384

(22) Filed: Jun. 26, 2001

(65) Prior Publication Data

US 2005/0164648 A1    Jul. 28, 2005

(30) Foreign Application Priority Data

Jun. 27, 2000   (SE)   .................................... 0002418

(51) Int. Cl.$^7$ ............................................. H04B 1/40
(52) U.S. Cl. .................. 455/84; 455/67.11; 455/67.14; 455/226.1
(58) Field of Search .................. 455/67.11, 67.14, 455/226.1, 226.2, 226.3, 226.4, 84, 423, 455/425

(56) References Cited

U.S. PATENT DOCUMENTS

| | | | | |
|---|---|---|---|---|
| 4,910,791 | A | * | 3/1990 | Dickinson et al. ........ 455/67.14 |
| 5,701,600 | A | * | 12/1997 | Wetters et al. ............... 455/208 |
| 5,835,850 | A | | 11/1998 | Kumar |
| 5,881,376 | A | * | 3/1999 | Lundberg et al. ......... 455/226.1 |
| 5,995,541 | A | * | 11/1999 | Navid et al. ................. 375/224 |
| 6,009,335 | A | * | 12/1999 | Murphy ....................... 455/423 |
| 6,236,839 | B1 | * | 5/2001 | Gu et al. ................. 455/67.14 |
| 6,615,024 | B1 | * | 9/2003 | Boros et al. ............. 455/67.14 |
| 6,735,182 | B1 | * | 5/2004 | Nishimori et al. .......... 370/294 |

FOREIGN PATENT DOCUMENTS

| | | |
|---|---|---|
| EP | 0825734 A2 | 2/1998 |
| GB | 2313523 A | 11/1997 |
| WO | WO91/19366 A1 | 12/1991 |
| WO | WO00/33491 A1 | 6/2000 |

* cited by examiner

Primary Examiner—Bing Q. Bui

(57) ABSTRACT

The invention relates to the field of methods and arrangements pertaining to transceivers. The object of the invention is to enable transceivers to be used more simply and more cheaply. This is achieved with an improved method of calibrating transceivers, and with transceivers that can be calibrated in accordance with the method. A sequence of signal connections (60–70) is established between a transmitter chain (3) and a receiver chain (5) in a transceiver. A corresponding sequence of signal paths is established from a baseband stage in the transmitter chain to a baseband stage in the receiver chain. Each signal path includes at least one specific component that shall be calibrated with the use of the established signal path, wherein any further components in said signal path will have already been calibrated with the use of earlier established signal paths. When calibrating the components, pre-determined test signals (TS1–TS11) are sent over the signal paths, wherein the response signals (RS1–RS11) are received as a response to the transmitted test signals. It is ascertained whether or not the components in the transceiver fulfil pre-determined performance requirements, on the basis of the test signals and the response signals. The components are adjusted when they do not fulfil performance requirements.

13 Claims, 16 Drawing Sheets

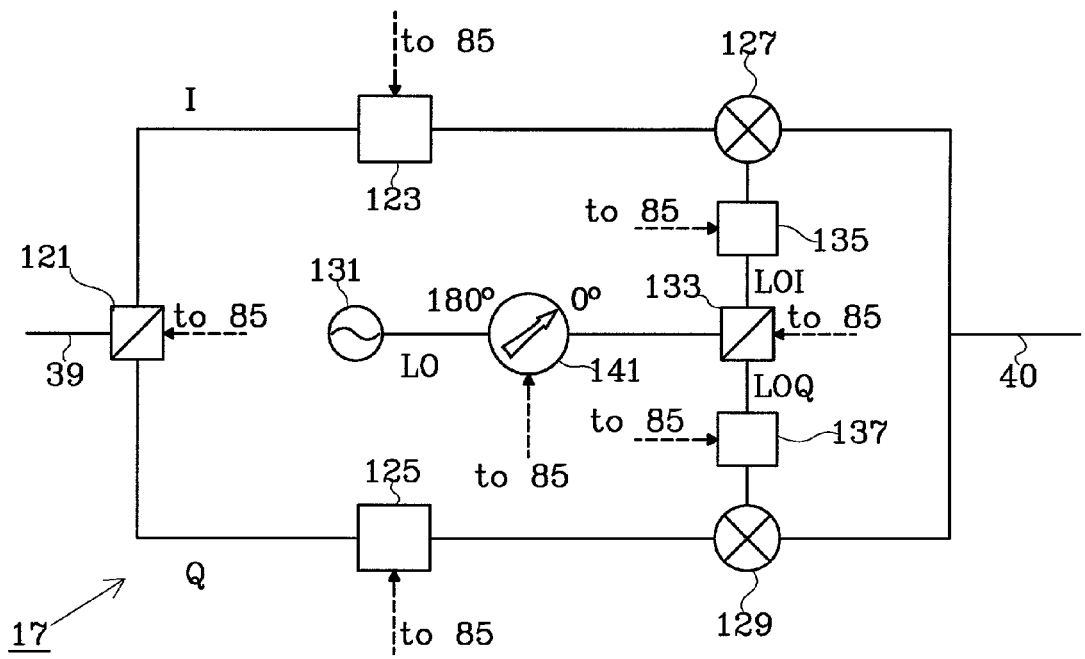
Fig. 6
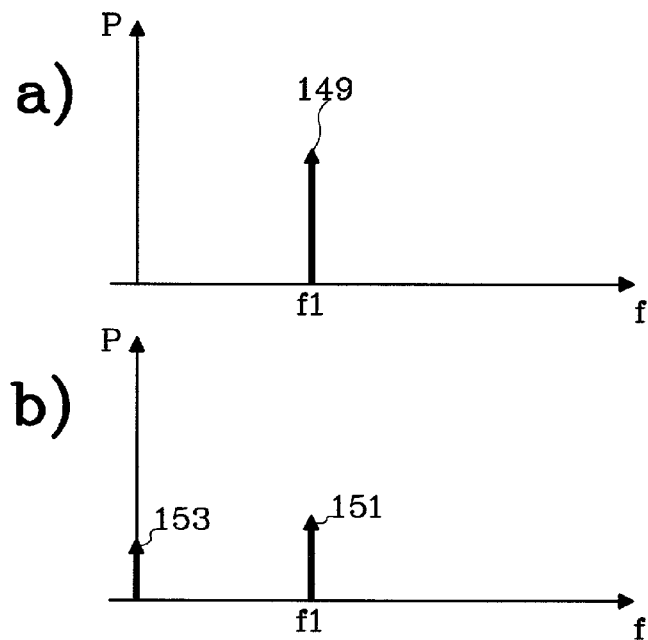
Fig. 7(a-b)

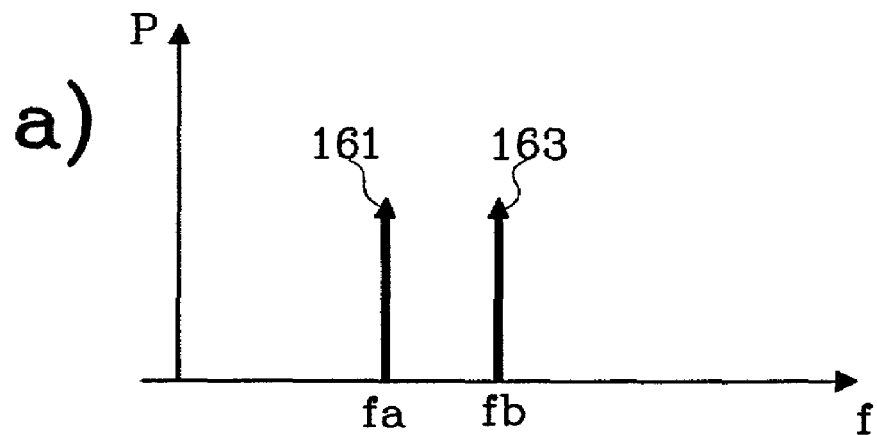
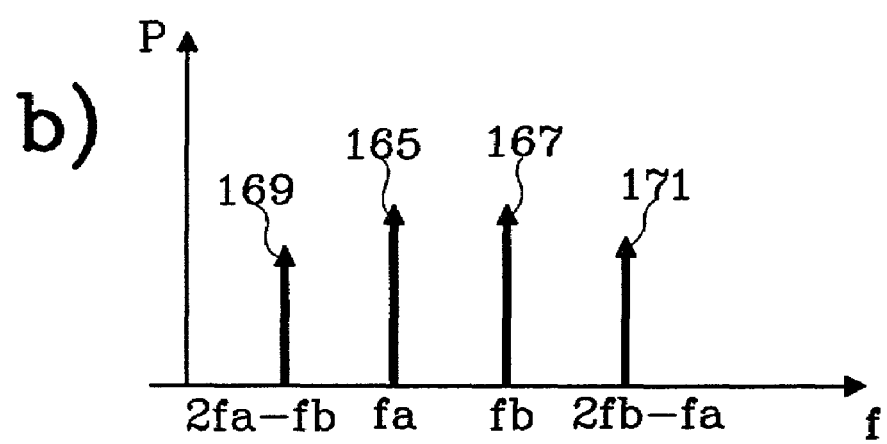
Fig. 16(a-b)

METHOD AND ARRANGEMENT RELATING TO TRANSCEIVERS

FIELD OF INVENTION

The present invention relates to the field of methods and arrangements pertaining to transceivers and more particularly to that part of said field concerned with transceiver calibration.

DESCRIPTION OF THE BACKGROUND ART

A transceiver is a device that can receive and transmit radio radiation. The transceiver is used within many technical fields, such as in radio communication, radio astronomy, radar and microwave technology. The transceiver often includes one or more integrated circuits (ASIC), either totally or partially.

It is normally required in the construction of a transceiver that the transceiver will fulfil a stipulated certification, which relates, of course, to the field of application for which the transceiver is intended. For example, the specification may place requirements on the noise factor of the transceiver and on the submission of spurious radiation, harmonics, etc. At present, it is often necessary to fulfil the specification in the construction of the transceiver, with a good margin due to such uncertainties and temperature variations, random variations in transceiver manufacture, and possibly erroneous matching between different transceiver stages. However, this often results in higher power consumption and normally lengthens the construction time.

In order to fulfil this specification, it is necessary that the transceiver components, in turn, fulfil certain performance requirements. Because of variations in the transceiver components, a newly manufactured transceiver will not always fulfil its specification. It is therefore desirable to be able to test whether or not the transceiver fulfils its specification. U.S. Pat. No. 5,835,850 teaches a transceiver construction that can be tested so as to ascertain whether or not it functions satisfactorily. The transceiver construction includes means for transmitting a test signal throughout the entire transmitter-receiver chain, and to compare this test signal with a received signal and thereby determine whether or not the construction functions satisfactorily. However, if it is found that the construction is unsatisfactory functionally, there seems to be no possibility of determining which construction component or components malfunctions or malfunction. Neither does it seem possible to adjust or calibrate the construction, either in its entirety or with respect to its components.

A known method with which transceiver components can be calibrated is designated an RF-test. An RF-test involves sending specially selected test signals to a transmitter chain in the receiver, wherewith corresponding response signals are received from the radio frequency stage of the transmitter chain. As a result of this special selection of test signals, the components in the transmitter chain can be examined and calibrated, by comparing the test signals with the response signals. A receiver chain in the transceiver is calibrated in a similar fashion, by injecting particularly selected test signals into the radio frequency stage of the receiver chain, wherewith corresponding response signals are received from the baseband stage of the receiver chain. The special selection of test signals enables the receiver chain components to be examined and calibrated on the basis of comparisons of the test signals with the response signals.

However, RF-testing has several drawbacks. RF-testing is expensive and time consuming, among other things because a large part of the signal processing procedure takes place in the radio frequency range. The accuracy achieved when calibrating with an RF-test is relatively poor, particularly with respect to power levels. Moreover, it is difficult to calibrate radio frequency stages in the transmitter chain and in the receiver chain with RF-testing, due to the influence exerted by the equipment utilised in RF-testing.

SUMMARY OF THE INVENTION

The present invention relates chiefly to the problem of making the construction, manufacture and use of transceivers simpler and cheaper.

The above formulated problem is solved, in brief, by means of an improved transceiver calibrating method, wherein the invention also includes a transceiver circuit that is suitable for calibration in accordance with the improved method.

An essential aim of the present invention is thus to make the construction, manufacture and use of transceivers simpler and cheaper, wherewith the invention includes both methods and arrangements with which this aim is achieved.

The above formulated problem is solved more specifically in accordance with the following measures. A sequence of signal connections is established between a transmitted chain and a receiver chain in a transceiver. This results in a corresponding sequence of signal paths from a baseband stage in the transmitter chain to a baseband stage in the receiver chain. Each such signal path includes at least one specific component that shall be calibrated with the use of the established signal path, any further components in the signal path having already been calibrated with the use of earlier established signal paths. The components are calibrated by sending pre-determined test signals over the signal paths, wherewith response signals are received in response to the transmitted test signals. Whether or not the transceiver components fulfil pre-determined performance requirements is determined on the basis of the test signals and the response signals, said components being adjusted when they fail to fulfil said performance requirements.

The present invention affords several advantages over known technology. For instance, the invention enables individual transceiver components to be readily calibrated. The components in all transceiver stages can be calibrated. Calibration of the transceiver components can be carried out accurately. All signal processing is effected at lower frequencies.

The invention will now be described in more detail with reference to preferred embodiments thereof and also with reference to the accompanying drawings.

BRIEF DESCRIPTION OF THE DRAWINGS

FIG. 6 is a block diagram illustrating a further mixer in the transceiver.

FIG. 7 is a diagrammatic illustration of the power spectrum of signals used in calibrating the transceiver.

FIG. 16 is a diagrammatic illustration of the power spectrum of signals used in calibrating the transceiver.

DESCRIPTION OF PREFERRED EMBODIMENTS

Figure 1:
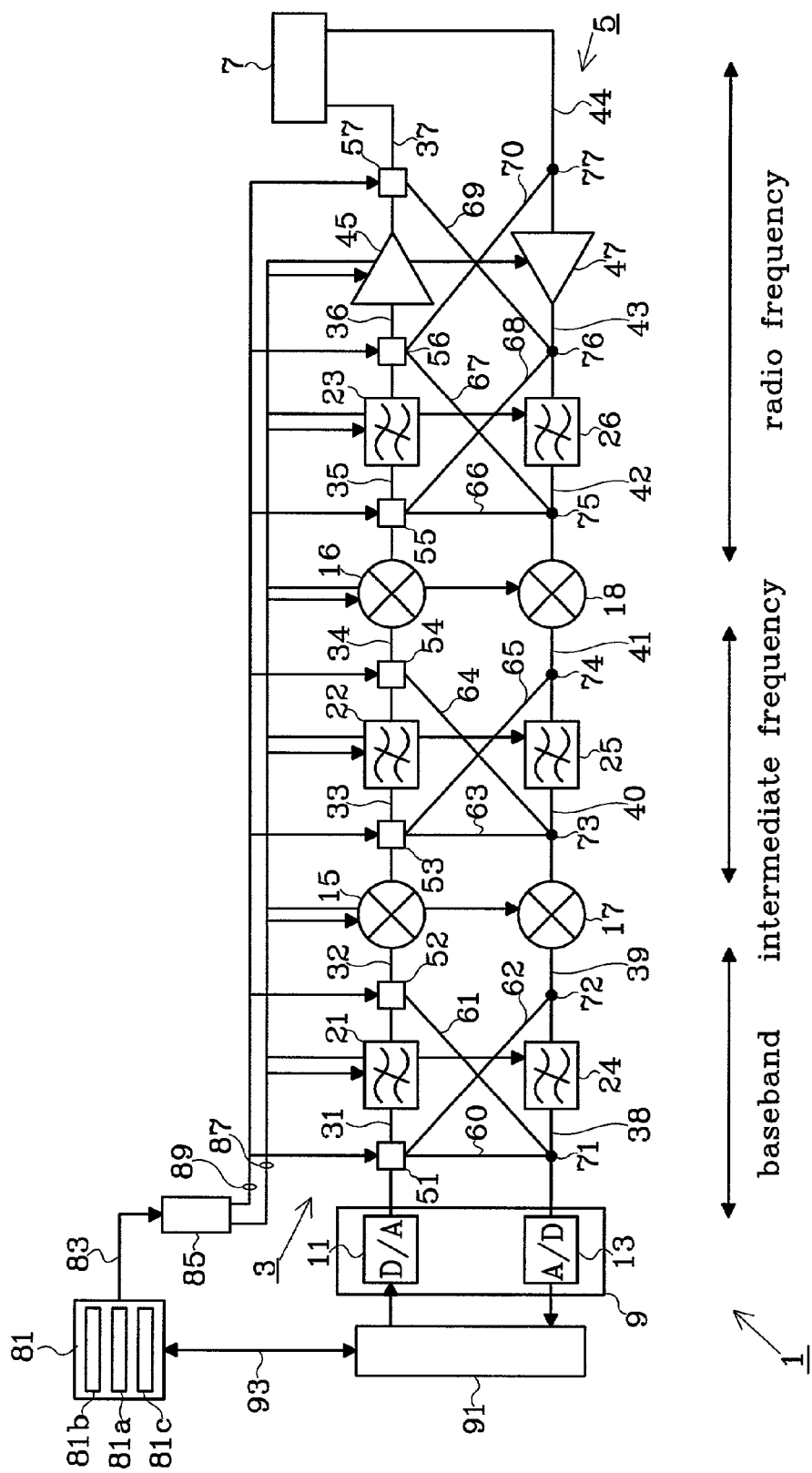
FIG. 1 is a block diagram of a circuit that includes a transceiver according to the present invention.

FIG. 1 is a block diagram that illustrates a circuit 1 which includes a (radio) transceiver. The transceiver includes a transmitter chain 3 and a receiver chain 5. The transmitter chain 3 and the receiver chain 5 each includes three frequency stages—a baseband stage, an intermediate frequency stage, and a radio frequency stage. The radio frequency stage is connected to an antenna unit 7. The baseband stages are also connected to a digital interface 9 with a D/A-converter 11 which is connected to the transmitter chain 3, and an A/D-converter 13 which is connected to the receiver chain 5. The transmitter chain 3 includes respectively a first mixer 15 and a second mixer 16 disposed between the baseband stage and the intermediate frequency stage and between the intermediate frequency stage and the radio frequency stage respectively in the transmitter chain 3. Correspondingly, the receiver chain 5 includes a third mixer 17 and a fourth mixer 18 disposed between the baseband stage and the intermediate frequency stage and between the intermediate frequency stage and the radio frequency stage respectively in the receiver chain 5. The mixers 15–18 are adapted to effect frequency transposition between the different frequency stages in the transceiver, in a manner well known.

The baseband stage of the transmitter chain 3 includes a baseband filter 21 and a first signal conductor 31 and a second signal conductor 32, which are adapted to connect the baseband filter 21 to the D/A-converter 11 and to the first mixer 15 respectively. The baseband stage of the receiver chain 5 includes, correspondingly, a baseband filter 24, a first signal conductor 38, and a second signal conductor 39, which are adapted to connect the baseband filter 24 to the A/D-converter 13 and to the third mixer 17 respectively.

The intermediate frequency stage of the transmitter chain 3 includes an intermediate frequency filter 22 and a first signal conductor 33 and a second signal conductor 34 respectively, which are adapted to connect the intermediate frequency filter 22 to the first mixer 15 and to the second mixer 16 respectively. Correspondingly, the intermediate frequency stage of the receiver chain 5 includes an intermediate frequency filter 25 and a first signal conductor 40 and a second signal conductor 41, which are adapted to connect the intermediate frequency filter 25 to the third mixer 17 and to the fourth mixer 18 respectively.

The radio frequency stage of the transmitter chain 3 includes a radio frequency filter 23 and a transmitter amplifier 45. The radio frequency stage of the transmitter chain 3 also includes a first, a second, and a third signal conductor 35, 36 and 37 respectively. The first signal conductor 35 is adapted to connect the radio frequency filter 23 to the second mixer 16. The second signal conductor 36 is adapted to connect the radio frequency filter 23 to the transmitter amplifier 45. The third signal conductor 37 is adapted to connect the transmitter amplifier 45 to the antenna unit 7.

Similarly, the radio frequency stage of the receiver chain 5 includes a radio frequency filter 26 and a receiver amplifier 47, for instance a low noise amplifier. The radio frequency stage of the receiver chain 5 also includes respectively a first, second and third signal conductor 42, 43 and 44. The first signal conductor 42 is adapted to connect the radio frequency filter 26 to the fourth mixer 18. The second signal conductor 43 is adapted to connect the radio frequency filter 26 to the receiver amplifier 47. The third signal conductor 44 is adapted to connect the receiver amplifier 47 to the antenna unit 7.

The transceiver components are adapted so that their performance can be adjusted in response to a command from a control unit 81. The control unit 81 is connected to a serial interface 85 by means of a signal conductor 83. The serial interface 85 is, in turn, connected to the different transceiver components by means of a first set of signal conductors 87. The control unit 81 controls the transceiver components through the medium of said serial interface 85 with serial data packets that include address information indicating the component or component part that shall be controlled, and also control information that indicates how the address component (or the addressed part of said component) shall be controlled.

In the case of the circuit 1 illustrated in FIG. 1, the components are controlled serially via the serial interface 85, although, as will be understood, the invention is not limited to this form of control and that, alternatively, said control can be carried out in any way considered suitable by the skilled person in view of the prevailing circumstances. For example, the control can be effected with the aid of a parallel bus.

The signal conductors 31–37 in the transmitter chain 3 include controllable switches 51–57. The signal conductors 31–37 are unbroken when the switches 51–57 are in their normal states. However, the switches 51–57 are also adapted to enable them to be set to positions in which switching is effected from the signal conductors 31–37 in the transmitter chain 3 to signal conductors 60–70 that are connected to the signal conductors 38–44 in the receiver chain 5 in a pre-determined way. Thus, by controlling the switches 51–57 it is possible to establish pre-determined signal connections between the transmitter chain 3 and the receiver chain 5, which is exploited when calibrating the transceiver, as will be described in more detail further on. The switches 51–57 are controlled from the control unit 81, via the serial interface 85 and a second set of signal conductors 89 that interlink the serial interface 85 with the switches 51–57.

The switches 51–57 are disposed in the transmitter chain 3 in the case of the FIG. 1 illustration. However, one or several or all of the switches 51–57 may be disposed in the receiver chain 5 instead.

A signal processing unit 91 is connected to the digital interface 9. The signal processing unit 91 is also connected to a communications link 93 with the control unit 81. The signal processing unit 91 is designed to generate specifically selected digital signals in response to a command from the control unit 81, these signals being applied to the D/A-converter 11. The signal processing unit 91 is also designed to receive digital signals from the A/D-converter 13. In one preferred embodiment, the signal processing unit 91 includes a processor (not shown) and associated software for digital signal processing. However, the signal processing unit 91 may have some other design, for instance in the form of circuitry (hardware).

The control 81 includes three major parts—a processor part 81a that includes one or more processors, a memory part 81b that includes memory space or memory section for storing programs that control the operations of the control unit 81, and memory space for storing data used in the work carried out the control unit 81, and a communications part 81c with which the control unit 81 communicates, with the signal processing unit 91 on the one hand and the serial interface 85 on the other hand. Alternatively, the control unit 81 may be constructed in some other way, for instance as circuitry (hardware).

In the case of the FIG. 1 illustration, the control unit 81 and the signal processing unit 91 are two separate units, although they may, instead, be integrated in one single unit.

In a preferred embodiment, the circuit 1 is disposed on a single circuit board or chip. Alternatively, the circuit 1 may be divided between a number of circuit boards or chips. For example, the transceiver may be arranged on one single circuit board with the remaining components being arranged on one or more further circuit boards.

The manner of operation of the circuit 1 in FIG. 1 in calibrating the transceiver will now be described.

Figure 2:
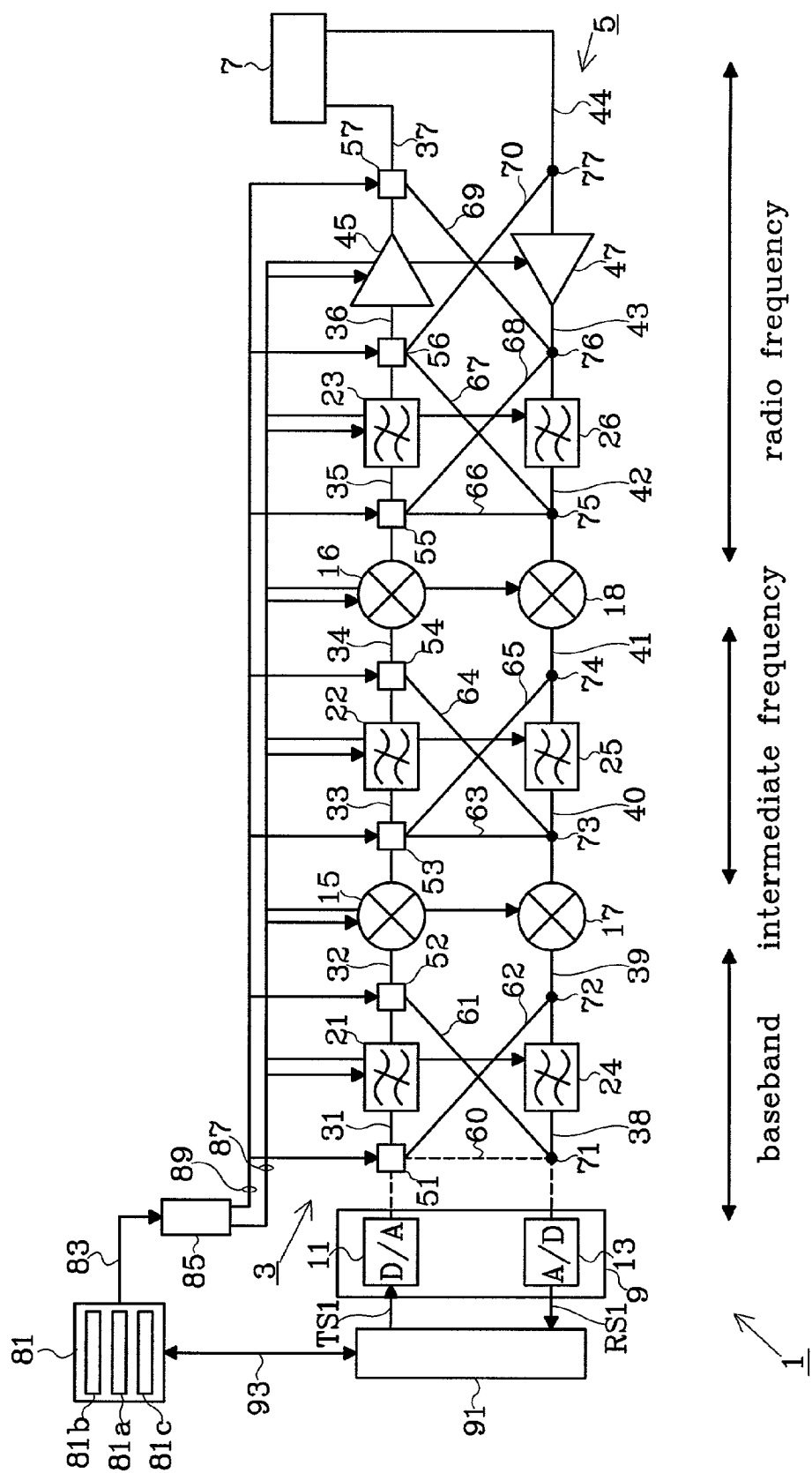
FIGS. 2–3 illustrate the circuit of FIG. 1, where signal paths used in calibrating the transceiver are indicated in broken lines.

The method is commenced by mapping the signal influence of the digital interface 9. The switch 51 is set by the control unit 81 to a position in which switching takes place from the signal conductor 31 to a first end of the signal conductor 60. A second end of the signal conductor 60 is connected to a coupling point 71 on the signal conductor 38 in the baseband stage of the receiver chain 5. There is thus established a signal connection from the signal conductor 31 in the baseband stage of the transmitter chain 3 to the signal conductor 38 in the baseband stage of the receiver chain 5. There is therewith obtained a first signal path from the baseband stage in the transmitter chain 3 to the baseband stage in the receiver chain 5. The first signal path is indicated in broken lines in FIG. 2. The signal processing unit 91 is adapted to generate a first test signal TS1 from the control unit, this first test signal being D/A-converted in the digital interface 9 and then sent over the first signal path. The first test signal TS1 is a multi-frequency signal that includes at least frequencies in a baseband range predetermined for the transceiver. In a preferred embodiment, the first test signal TS1 is a frequency sweep or scan. However, the first test signal TS1 may be of an alternative kind, for instance the sequence of harmonically oscillating signals of mutually different frequencies. When the first test signal TS1 is sent over the first signal path, the signal processing unit 91 receives, via the A/D-converter 13, a first response signal RS1 corresponding to the first test signal TS1. As a result of signal influence from the digital interface 9, the first response signal RS1 will differ from the first test signal TS1. The control unit 81 and the signal processing unit 91 are adapted to map the signal influence of the digital interface 9, by comparing the first test signal TS1 with the first response signal RS1. In a preferred embodiment, the signal processing unit is adapted to Fourier transform the first test signal TS1 and the first response signal RS1, for instance by using FFT—algorithms (Fast Fourier Transform). The amplitude and phase influence processes by the digital interface 9 for frequencies within the pre-determined baseband range are established from the Fourier transforms. Information relating to the amplitude and phase influence of the digital interface 9 is stored in the memory space 81b.

Figure 3:
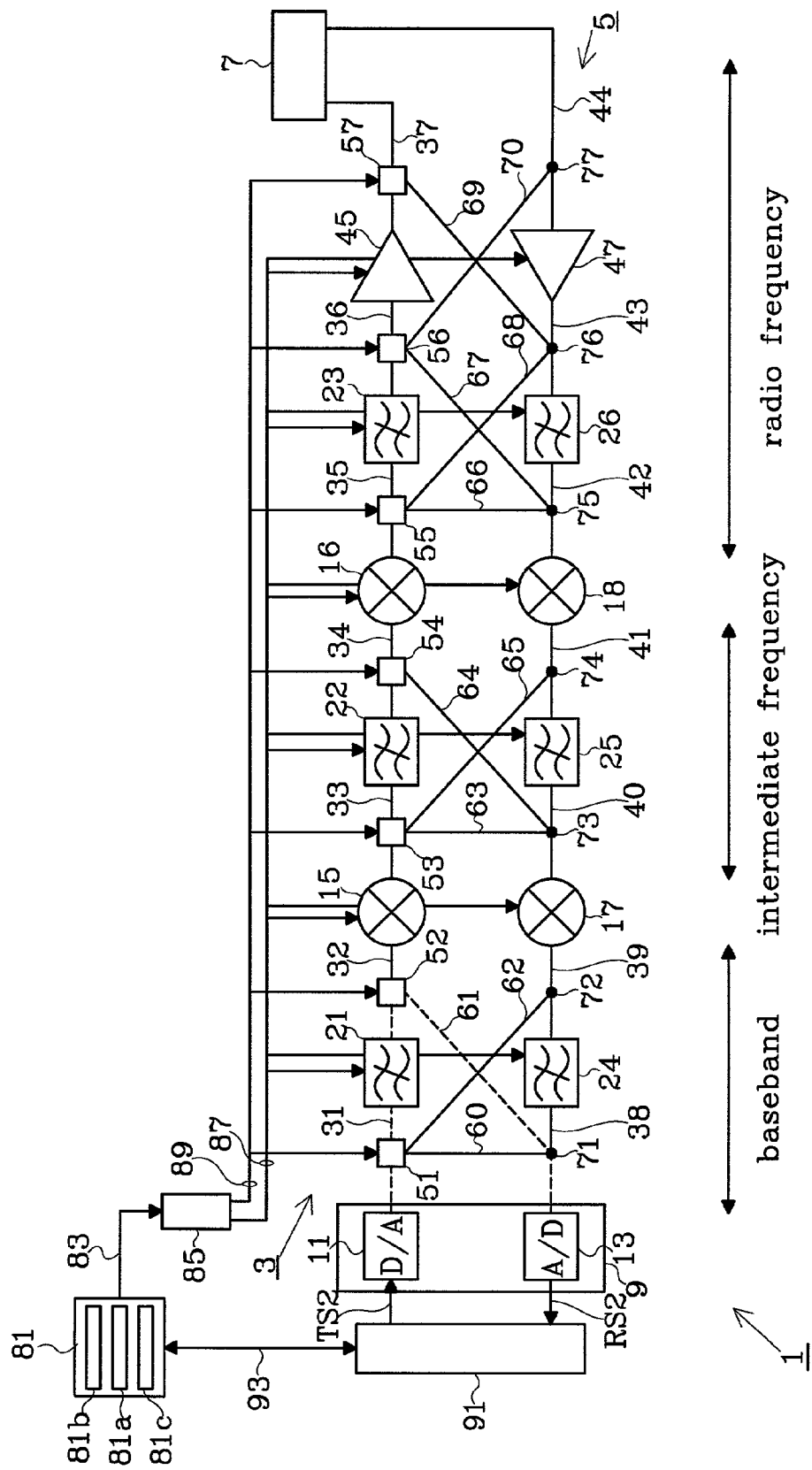

The method continues with the calibration of the baseband filter 21 of the transmitter chain 3. The switch 51 is set to a normal position or state by the control unit 81. The switch 52 is set by the control unit 81 to a position or state in which switching takes place from the signal conductor 32 to a first end of the signal conductor 61. A second end of the signal conductor 61 is connected to the coupling point 71 on the signal conductor 38. Thus, a signal connection is established from the signal conductor 32 in the baseband stage of the transmitter chain 3 to the signal conductor 38 in the baseband stage of the receiver chain 5. This results in a second signal path from the baseband stage in the transmitter chain 3 to the baseband stage in the receiver chain 5. The second signal path is indicated in broken lines in FIG. 3.

Figure 4:
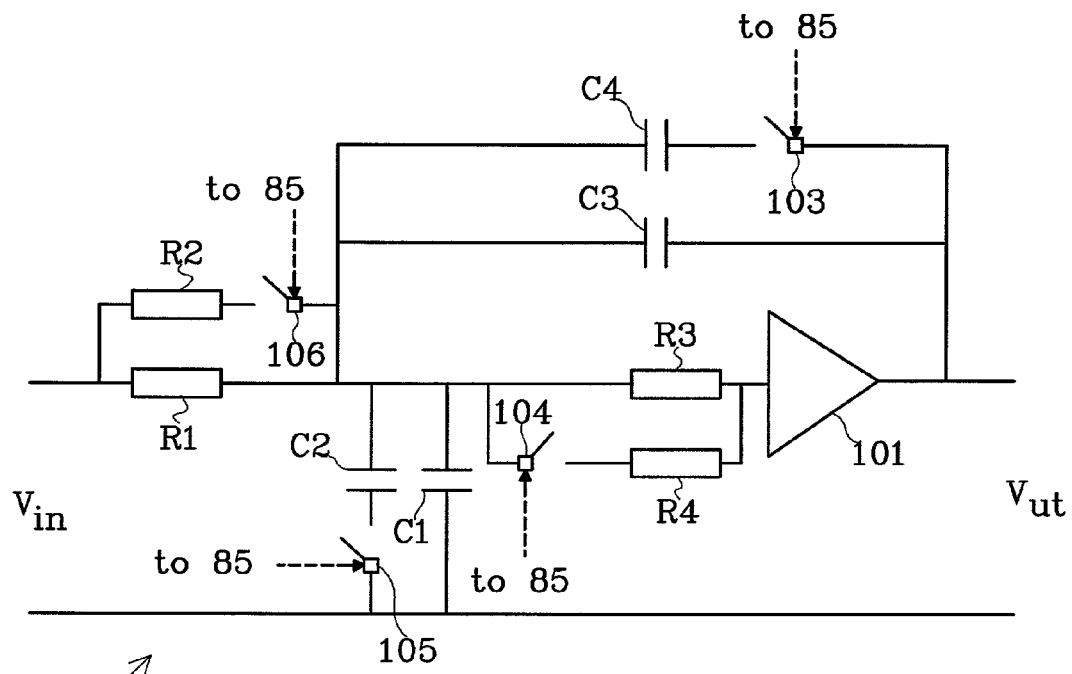
FIG. 4 is a block diagram of a controllable filter in the transceiver.

FIG. 4 is a block diagram illustrating a preferred construction of the baseband filter 21. The filter construction in FIG. 4 is based on an operational amplifier 101 and includes fixed resistors R1 and R3 and capacitors C1 and C3 on the one hand, and resistors R2 and R4 and capacitors C2 and C4 on the other hand, which can be activated or deactivated with the aid of controllable switches 103–106. The controllable switches 103–106 are controlled by the control unit 81, via the serial interface 85. Because the baseband filter 21 of the FIG. 4 embodiment includes four controllable switches 103–106, a filter characteristic of 16 ($2^4$) can be set. In the FIG. 4 embodiment, the baseband filter 21 includes four impedance components R2, R4, C2 and C4 which can be activated or deactivated with the aid of the associated switches 103–106. It will be understood that the invention is not restricted to precisely this number, and that the baseband filter 21 may include more or fewer such impedance components and switches. However, the invention is not restricted to the type of controllable filter shown in FIG. 4, and other types of controllable filter may, of course, be used.

The baseband filter 21 is a low-pass filter which functions to allow frequencies in the baseband range to pass through and to suppress higher frequencies (for instance harmonic generated in the D/A-converter 11). Information that describes that pre-determined performance requirements that shall be fulfilled by the baseband filter 21 is stored in the memory section 81b. The nominal values of the resistors R1–R4 and the capacitors C1–C4 are chosen with respect to these pre-determined performance requirements. What constitutes the pre-determined performance requirements will, of course, depend on the anticipated application of the transceiver and on the specification for the transceiver as a whole. For example, the performance requirement of the baseband filter 21 may specify a smallest permitted suppression of frequencies from and including the lowest harmonics generated by the D/A-converter 11. A suitable value in respect of the least permitted suppression is, in many instances, 30 dB or thereabouts.

The signal processing unit 91 is adapted to generate a second test signal TS2 in response to a command from the control unit 81, this second test signal being transmitted over the second signal path subsequent to D/A-conversion in the digital interface 9. The second test signal TS2 is a multi-frequency signal and includes at least frequencies in a frequency range in which performance with respect to the baseband filter 21 is set. It is preferred that the second test signal TS2 is a frequency sweep. It is also preferred that the second test signal TS2 will include solely one I-component (in-phase component) or, alternatively, only one Q-component (quadrature component). In this way, calibration will not be influenced by any phase and amplitude differences between the I-channel and the Q-channel. When the second test signal TS2 is sent over the second signal path, the signal processing unit 91 will receive, via the A/D-converter 13, a second response signal RS2 that corresponds to the second test signal TS2. The control unit 81 and the signal processing unit 91 are adapted to map the characteristic of the baseband filter 21, by comparing the second test signal TS2 with the second response signal RS2. In this respect, the stored information concerning the amplitude and phase influence of the digital interface 9 is used to correct the signal influence of the digital interface 9. The correction is carried out by taking into consideration the amplitude and phase influence of the digital interface 9 when performing said calculations in the control unit 81 and the signal processing unit 91. Alternatively, the correction is made by correcting the second test signal TS2 in respect of the influence of the digital interface 9 from the outset. In a preferred embodiment, the signal processing unit 91 is adapted to Fourier transform the second test signal TS2 and the second response signal RS2. The characteristic of the baseband filter 21 is established from the Fourier transform. The measured characteristic is compared with the stored information that describes the pre-determined performance requirement that the baseband filter 21 is required to fulfil. If the performance of the baseband filter 21 is unacceptable, the control unit functions to adjust the characteristic of the baseband filter 21, by re-setting one or more of the switches 103–106 in the baseband filter 21. If necessary, the procedure is repeated until the performance of the baseband filter 21 is found acceptable. When the baseband filter 21 has attained acceptable performance, the control unit 81 functions to store the measured characteristic of the baseband filter 21 in the memory section 81b.

Figure 8:
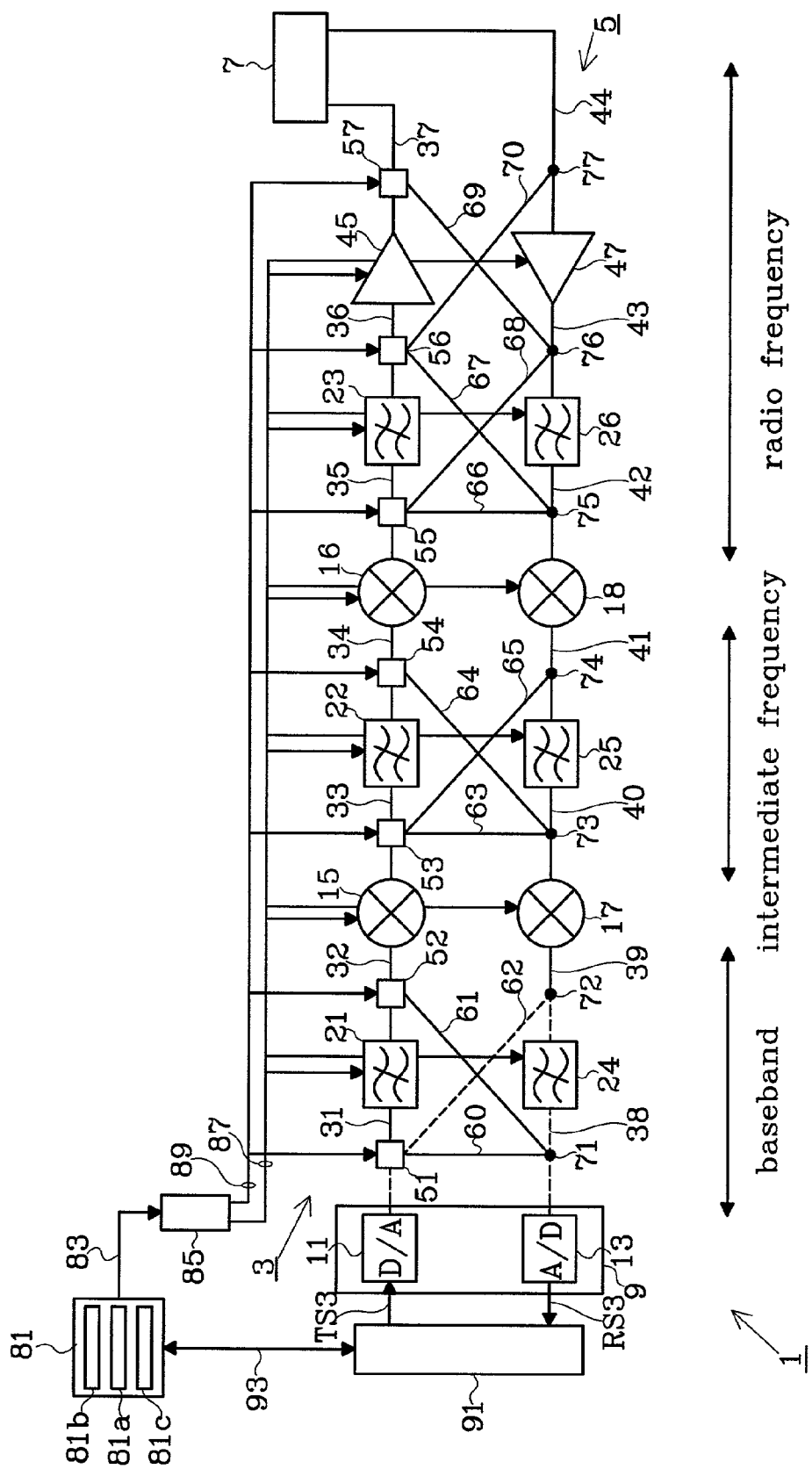
FIGS. 8–15 illustrate the circuit of FIG. 1, where signal paths used in transceiver calibration are indicated in broken lines.

The method continues with the calibration of the baseband filter 24 in the receiver chain 5. The baseband filter 24 is a low-pass filter whose function corresponds to the function of the baseband filter 21 in the transmitter chain 3. The baseband filter 24 is of similar construction to the baseband filter 21 in FIG. 4. Information describing the pre-determined performance requirements placed on the baseband filter 24 is stored in the memory section 81b. The control unit 81 sets the switch 51 in a position in which switching from the signal conductor 31 to a first end of the signal conductor 62 is effected. A second end of the signal conductor 62 is connected to a coupling point 72 on the signal conductor 39 in the baseband stage of the receiver chain 5. Thus, a signal connection is established from the signal conductor 31 in the baseband stage of the transmitter chain 3 to the signal conductor 39 in the baseband stage of the receiver chain 5. The remaining switches 51 and 53–57 are herewith set to their normal states. There is obtained in this way a third signal path from the baseband stage of the transmitter chain 3 to the baseband stage of the receiver chain 5. This third signal path is indicated in broken lines in FIG. 8. The signal processing unit 91 is adapted to generate a third test signal TS3 in response to a command from the control unit 81, this third test signal being sent over the third signal path, subsequent to D/A-conversion in the digital interface 9. When the third test signal TS3 is sent over the third signal path, the signal processing unit 91 will receive a corresponding third response signal RS3. The third test signal TS3 has the same properties as the second test signal TS2, and the baseband filter 24 in the receiver chain 5 is calibrated in a manner corresponding to that in which the baseband filter 21 in the transmitter chain 3 is calibrated. When the baseband filter 24 is calibrated, the measured characteristic of the baseband filter 24 is stored in the memory section 81b.

The method continues with the calibration of the first mixer 15 and the third mixer 17, which are adapted for frequency transposition between the baseband range and an intermediate frequency range pre-determined for the transceiver.

Figure 5:
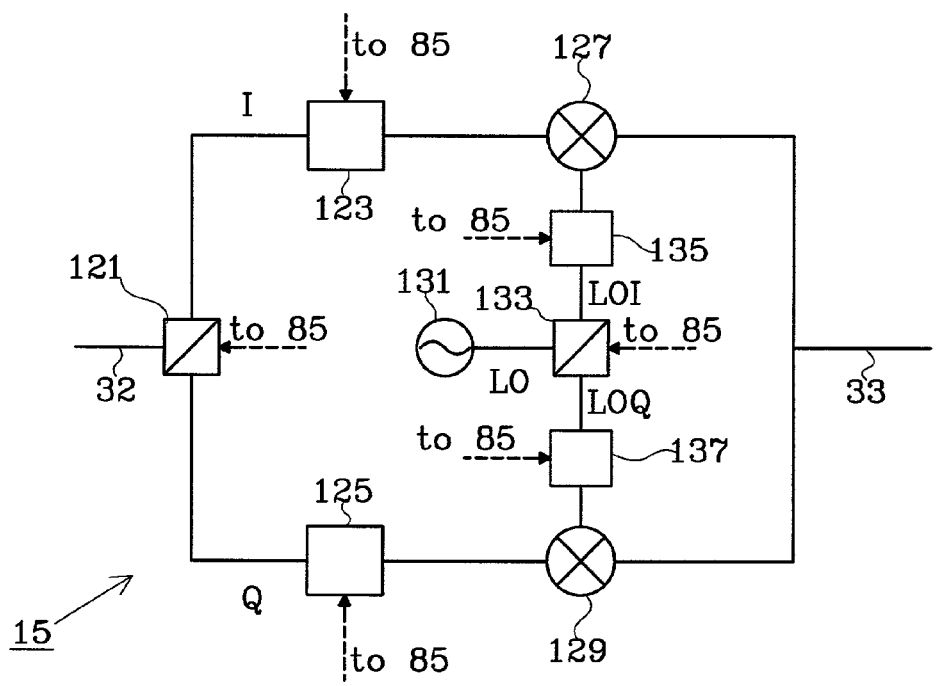
FIG. 5 is a block diagram of a mixer in the transceiver.

FIG. 5 illustrates a preferred construction of the first mixer 15. The first mixer 15 includes a first adjustable phase splitter 121. The first phase splitter 121 is connected to the signal conductor 32 in the transmitter chain and functions to split an incoming signal into an I-component and a Q-component. A first phase splitter 121 is also connected to the serial interface 85, therewith enabling the control unit 81 to adjust the first phase splitter 121. The first mixer 15 is adapted so that the I-component will be delivered to a first sub-mixer 127 via a first D.C. regulator 123. Correspondingly, the first mixer 15 is adapted so that the Q-component is delivered to a second sub-mixer 129, via a second D.C.-regulator 125. The D.C.-regulators 123 and 125 are adapted to influence D.C. levels (DC offset) of the I- and Q-components respectively. The D.C.-regulators 123 and 125 are connected to the serial interface 85, and the influence of the D.C.-regulators 123 and 125 on the DC-levels is controlled by the control unit 81. The first mixer 15 also includes a second adjustable phase splitter 133 which is adapted to receive an oscillator signal LO from a local oscillator 131. The frequency of the oscillator signal LO is chosen with respect to a frequency spacing between the baseband range and the intermediate frequency range of the receiver. The second phase splitter 133 is adapted to split the oscillator signal into an I-part LOI and a Q-part LOQ. The second phase splitter 133 is connected to the serial interface 85, which enables the control unit 81 to adjust the second phase splitter 133. The first mixer 15 is adapted so that the I-part LOI of the oscillator signal LO will be delivered to the first sub-mixer 127, via a first controllable attenuator 135. Correspondingly, the first mixer is adapted to the Q-part LOQ of the oscillator signal LO will be delivered to the second sub-mixer 129, via a second controllable attenuator 137. The attenuators are connected to the serial interface 85 and are controlled by the control unit 81. The first mixer 15 is also adapted so that output signals from the sub-mixers 127 and 129 will be combined and delivered to the signal conductor 33.

FIG. 6 illustrates a preferred construction of the third mixer 17. The third mixer 17 has essentially the same construction as the first mixer 15, and, for the sake of simplicity, those components in the third mixer 17 that find correspondence in the components of the first mixer 15 have been identified by the same reference numerals as those used with respect to the first mixer 15. The only true difference between the first mixer 15 and the third mixer 17 is that the third mixer 17 includes a controllable phase shifter 141. The third mixer 17 is adapted so that the oscillator signal LO will be delivered to the second phase shifter 133, via the phase shifter 11. The adjustable phase shifter 141 is connected to the serial interface 85 and is controlled by the control unit 81. The phase shifter 141 is adapted to enable it to be set in a first phase shifting position and in a second phase shifting position respectively. Phase shift is 9° in the first phase shifting position. The phase shift is 180° in the second phase shifting position. In normal use of the transceiver, the phase shifter 141 is set in the first phase shifting position. However, the phase shifter 141 is set in said phase shifting position when calibrating the first and the second mixers 15 and 17.

The first mixer 15 in FIG. 5 and the third mixer 17 in FIG. 6 are constructed for the suppression of lower sidebands. However, in order to enable suppression of the lower sidebands, a phase difference of 90° is required between the 1-component and the Q-component. Moreover, a phase difference of 90° is required between the I-part LOI and the Q-part LOQ of the oscillator signal. A further requirement is that the I-channel and the Q-channel have essentially the same attenuation. These requirements can be fulfilled to a pre-determined extent, by adjustment of the phase shifters 121 and 133 and the attenuators 135 and 137, as will now be described.

Figure 9:
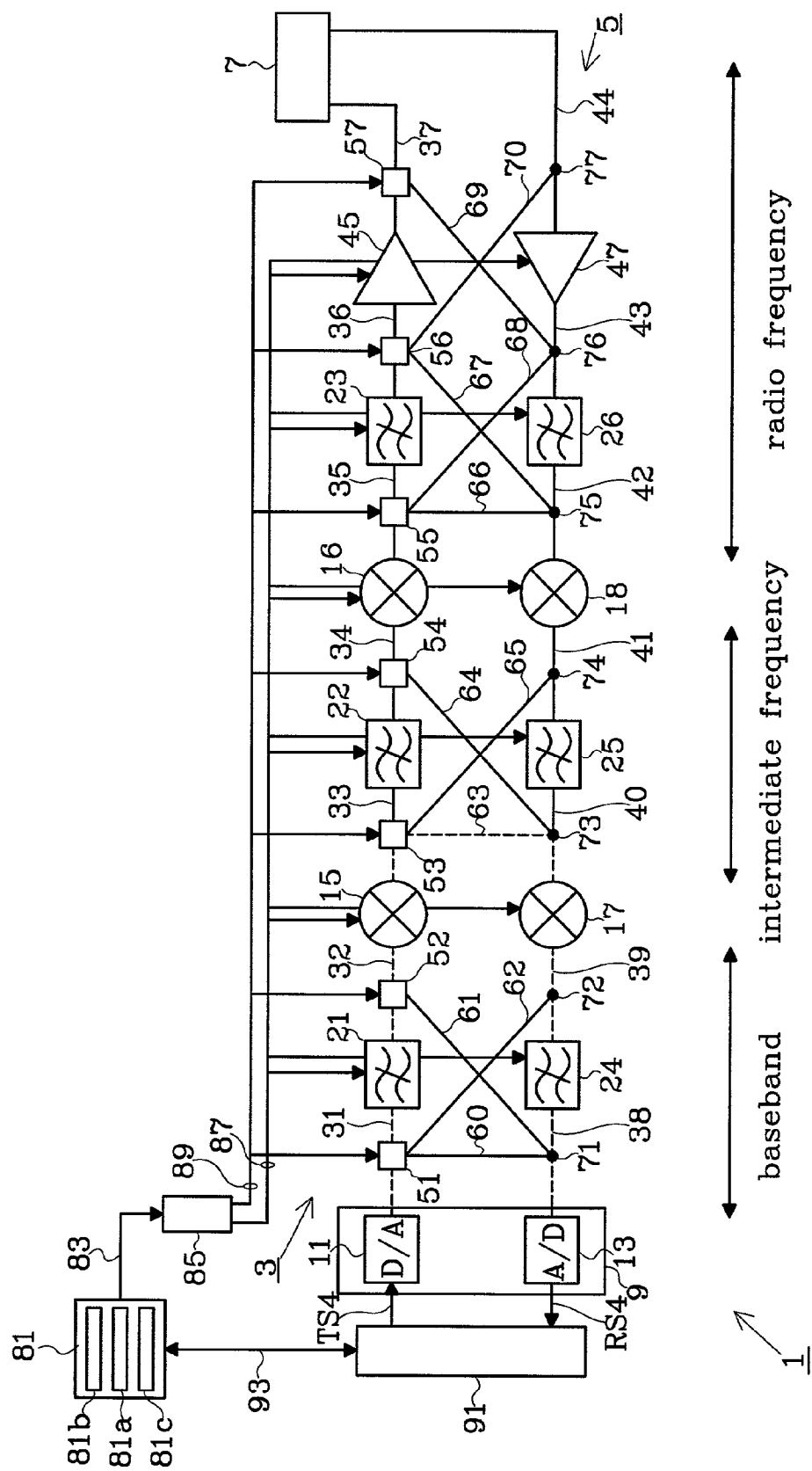

When calibrating the first and the third mixers 15 and 17, the control unit 81 functions to set the switch 53 to a state in which switching is effected from the signal conductor 33 to a first end of the signal conductor 63. A second end of the signal conductor 63 is connected to a coupling point 73 on the signal conductor 40. Thus, a signal connection is established between the signal conductor 33 in the transmitter chain 3 and the signal conductor 40 in the transmitter chain 5. In this respect, the remaining switches 51, 52 and 54–57 are set in their normal positions. There is therewith obtained a fourth signal path from the baseband stage in the transmitter chain 3 to the baseband stage in the receiver stage 5. This fourth signal path is indicated in broken lines in FIG. 9. The signal processing unit 31 is adapted to generate a fourth test signal TS4 in response to a command from the control unit, this fourth test signal being sent over the fourth signal path after D/A-conversion in the digital interface 9. The fourth test signal TS4 is a single-frequency signal having a frequency component 149 with a frequency f1 in the baseband range. A power spectrum relating to the fourth test signal TS4 is shown in the diagram in FIG. 7a.

When the fourth test signal TS4 is sent over the fourth signal path, the signal processing unit 91 receives, via the A/D-converter 13, a fourth response signal RS4 corresponding to the fourth test signal TS4. The signal processing unit 91 is adapted to generate a Fourier transform of the fourth response signal RS4. A typical power spectrum of the fourth response signal RS4 is evident from the diagram in FIG. 7b. This power spectrum includes a first frequency component 151 having the frequency f1, and a second frequency component 153 having the frequency 0. The first frequency component 151 is comprised of those parts of the lower (undesired) sidebands that are not suppressed in the mixers 15 and 17, as a result of the aforesaid criteria regarding phase difference and attenuation have not been completely fulfilled. In this respect, the control unit 81 functions to adjust the settings of the phase shifter 121 and 133 and the attenuators 135 and 137 in the mixers 15 and 17, until the first frequency component 151 lies beneath a pre-determined threshold.

The second frequency component 153 is comprised of those parts of the oscillator signals LO that are not suppressed in the mixers 15 and 17. In order for the oscillator signal LO to be suppressed by the mixers 15 and 17 to a pre-determined extent, the control unit 81 is adapted to control the DC-regulators 123 and 125 so as to adjust the DC levels of the I- and Q-components. Adjustment of the DC-levels continues until the second frequency component 153 lies beneath a pre-determined threshold.

The invention is not limited to precisely the types of mixer shown in FIGS. 5 and 6 and, of course, other types of mixer may be used.

The method continues with the calibration of the intermediate frequency filters 22 and 25. In a preferred embodiment, the intermediate frequency filters 22 and 25 are band pass filters that allow frequencies in the pre-determined intermediate frequency range to pass through, and to attenuate frequencies to a pre-determined extent outside this intermediate frequency range. In one preferred embodiment, the intermediate frequency filters 22 and 25 are constructed in a similar manner to the baseband filter 21 in FIG. 4. Data described the performance requirements placed on the intermediate frequency filters 22 and 25 is stored in the memory section 81b.

Figure 10:
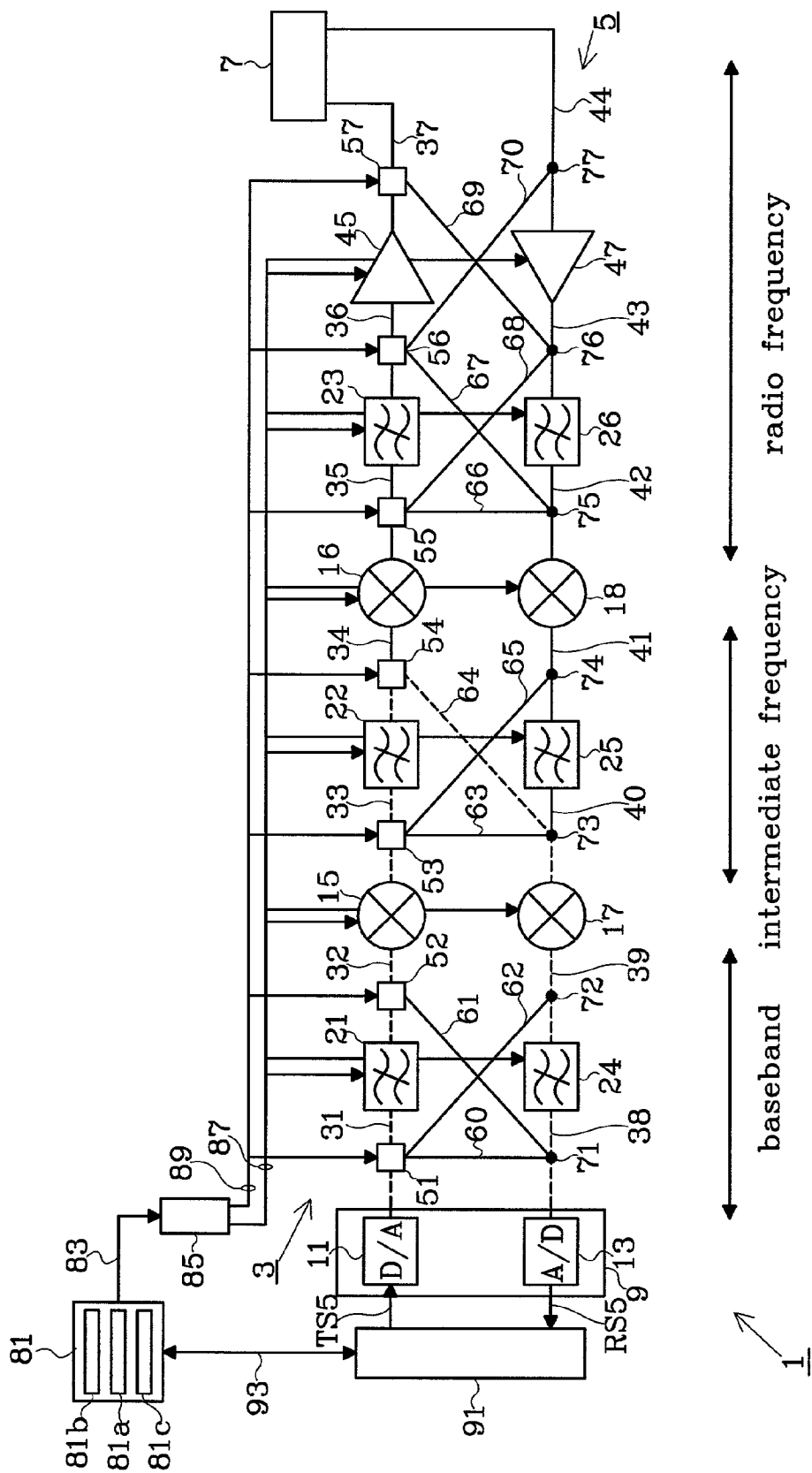

The control unit 81 sets the switch 54 in a position in which switching takes place from the signal conductor 34 to a first end of the signal conductor 64. A second end of the signal conductor 64 is connected to the coupling point 73 on the signal conductor 40. There is thus established a signal connection between the signal conductor 34 in the intermediate frequency stage of the transmitter chain 3 and the signal conductor 40 in the intermediate frequency stage of the receiver chain 5. In this respect, remaining switches 51, 53 and 55–57 are set in their normal positions or states. This results in a firth signal path from the baseband stage of the transmitter chain 3 to the baseband stage of the receiver chain 5. The fifth signal path is indicated by broken lines in FIG. 10. The signal processing unit 91 is adapted to generate a fifth test signal TS5 in response to a command from the control unit 81, said fifth test signal TS5 being sent over the fifth signal path subsequent to D/A-conversion in the digital interface 9. The fifth test signal TS5 is a multi-frequency signal that includes frequencies in the baseband range. The fifth test signal TS5 is a frequency sweep or scan in one preferred embodiment. It is also preferred that the fifth test signal TS5 will include only one I-component or, alternatively, only one Q-component. Thus, calibration will not be affected by any phase and amplitude differences between I- and Q-channels. When the fifth test signal TS5 is sent over the fifth signal path, the signal processing unit 91 receives, via the A/D-converter 13, a fifth response signal RS5 corresponding to the fifth test signal TS5. The control unit 81 and the signal processing unit 91 are adapted to map the characteristic of the intermediate frequency filter 22, by comparing the fifth test signal TS5 with the fifth response signal RS5. The information stored in the memory section 81b concerning the characteristics of the baseband filters 21 and 24 and the signal influence of the digital interface 9 is utilised in this respect to correct the affect that these components 21, 24 and 9 have when the fifth test signal TS5 is sent over the fifth signal path. The correction is made by taking into account the signal influence from the digital interface 9 and the baseband filters 21 and 22 when carrying out calculations in the signal processing unit 91 and the control unit 81. Alternatively, the correction can be made from the outset, by correcting the fifth test signal TS5 in respect of signal influence from the digital interface 9 and the baseband filters 21 and 24. In one preferred embodiment, the signal processing unit 91 functions to Fourier transform the fifth test signal TS5 and the fifth response signal RS5. The characteristic of the intermediate frequency filter 2 is determined from the Fourier transforms. The measured characteristic is compared with the performance requirements stored in the memory section 81b. If the intermediate frequency filter 22 does not fulfil the pre-determined performance requirements, the control unit 81 functions to adjust the characteristic of the intermediate frequency filter 22 by re-setting one or more switches with respect to the intermediate frequency filter 22. If necessary, this procedure is repeated until the performance of the intermediate frequency filter 22 is acceptable. The control unit 81 is adapted to store the measured characteristic of the intermediate frequency filter 22 in the memory section 81b, when the intermediate frequency filter 22 has attained an acceptable performance.

Naturally, the pre-determined performance requirements placed on the intermediate frequency filter 22 will depend on the intended application of the transceiver and on the specification concerning the transceiver as a whole. For example, the performance requirements of the baseband filter 22 may specify a least permitted attenuation in respect of frequencies from and including a frequency that corresponds to the double frequency of the oscillator signal LO in the first mixer 15. 40 dB or thereabout is, in many cases, a suitable value of the least or smallest permitted attenuation.

Figure 11:
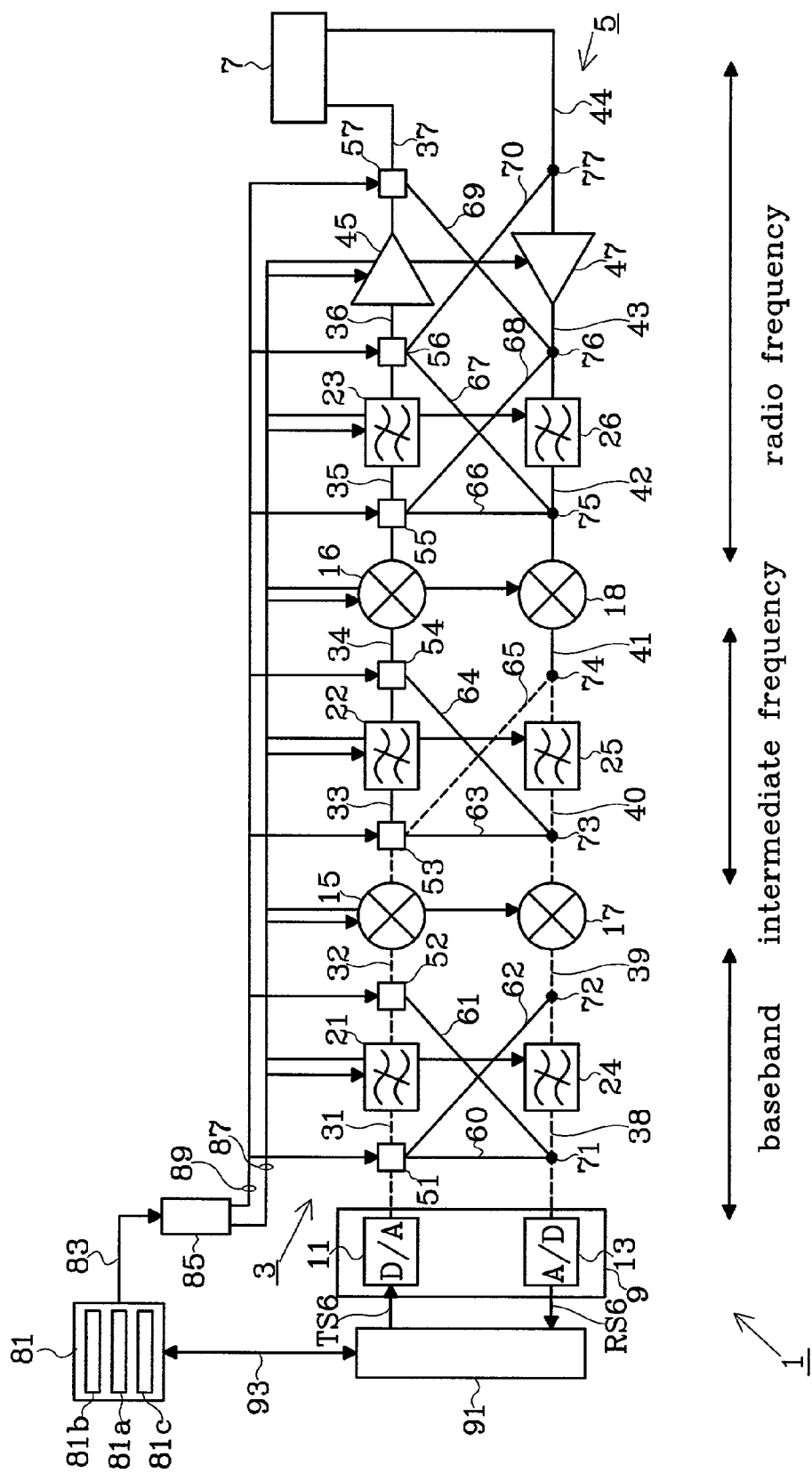

When the intermediate frequency filter 22 has been calibrated, the control unit 81 functions to set the switch 53 to a position in which switching is effected from the signal conductor 33 to a first end of the signal conductor 65. A second end of the signal conductor 65 is connected to a coupling point 74 on the signal conductor 41. Thus, a signal connection is established from the signal conductor 33 in the intermediate frequency stage of the transmitter chain 3 to the signal conductor 41 in the intermediate frequency stage of the receiver chain. In this regard, the remaining switches 51, 52 and 54–57 are set in their normal positions. There is therewith obtained a signal path from the baseband stage of the transmitter chain 3 to the baseband stage of the receiver chain 4. The sixth signal path is indicated in broken lines in FIG. 11. The signal processing unit 91 is adapted to generate a sixth test signal TS6 in response to a command from the control unit 81, this sixth test signal being set over the sixth signal path subsequent to D/A-conversion in the digital interface 9. The sixth test signal TS6 has the same properties as the fifth test signal TS5. When the sixths test signal TS6 is sent over the sixth signal path, the signal processing unit receives, via the A/D-converter 13, a sixth response signal RS6 corresponding to the sixth test signal TS6. The intermediate frequency filter 25 in the receiver chain 5 is calibrated by comparing the sixth test signal TS6 with the sixth response signal. Calibration of the intermediate frequency filter 25 in the receiver chain 5 is effected in other respects in a manner corresponding to calibration of the intermediate frequency filter 22 in the transmitter chain 3. Subsequent to calibration of the intermediate frequency filter 25, the control unit 81 functions to store the measured characteristic of the intermediate frequency filter 25 in the memory section 81*b*.

Figure 12:
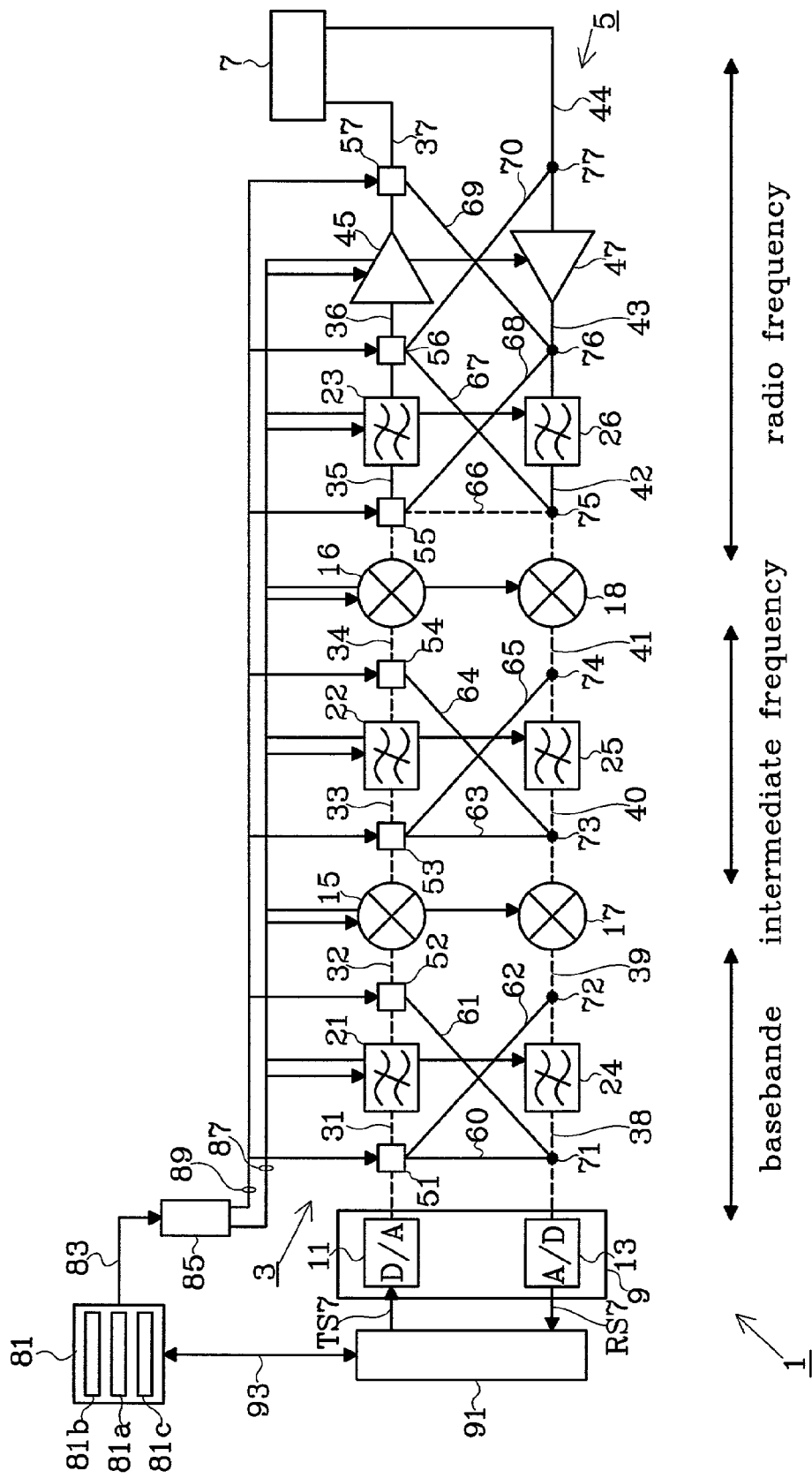

The method continues with calibration of the second mixer 16 and the fourth mixer 18. The construction of the second mixer 16 corresponds generally with the construction of the first mixer 15. The construction of the fourth mixer 18 corresponds generally with the construction of the third mixer 17. The oscillator signals LO used in the second mixer 16 and the third mixer 18 are adapted for frequency transposition between the intermediate frequency range and a pre-determined radio frequency range. The switch 55 is set by the control unit 81 to a position in which switching takes place from the signal conductor 35 to a first end of the signal conductor 66. A second end of the signal conductor 66 is connected to a coupling point 75 on the signal conductor 42. Thus, a signal connection is established from the signal conductor 35 in the radio frequency stage of the transmitter chain 3 to the signal conductor 42 in the radio frequency stage of the receiver chain. Remaining switches 51–54 and 56–57 are set in their normal positions in this regard. There is thus obtained a seventh signal path from the baseband stage of the transmitter chain 3 to the baseband stage of the receiver chain 5. The seventh signal path is indicated in broken lines in FIG. 12. The signal processing unit 91 is adapted to generate a seventh test signal TS7 in response to a command from the control unit 81, this seventh test signal being sent over the seventh signal path, subsequent to D/A-conversion in the digital interface 9. When the seventh test signal TS7 is sent over the seventh signal path, the signal processing unit 91 receives a seventh response signal RS7 corresponding to the seventh test signal TS7. The seventh test signal TS7 has the same properties as the fourth test signal TS4, and calibration of the second and the fourth mixers 16 and 18 continues in general in a manner corresponding to the calibration of the first and the third mixers 15 and 17, as described in detail earlier on.

The method continues with the calibration of the radio frequency filters 23 and 26. These filters are chiefly intended to filter out harmonics from the mixers 16 and 18. In a preferred embodiment, the radio frequency filters 23 and 26 are constructed in a manner similar to the baseband filter 21 in FIG. 4. Data that describes the performance requirements placed on the radio frequency filters 23 and 26 is stored in the memory section 81*b*. What constitutes the pre-determined performance requirements with regard to the radio frequency filters 23 and 26 will, of course, depend on the application for which the transceiver is intended and also on the specification concerning the transceiver as a whole. For example, the performance requirements placed on the radio frequency filters 23 and 26 may specify the extent to which the harmonics shall be suppressed. Harmonic attenuation of 30 dB or thereabouts is suitable in many instances.

Figure 13:
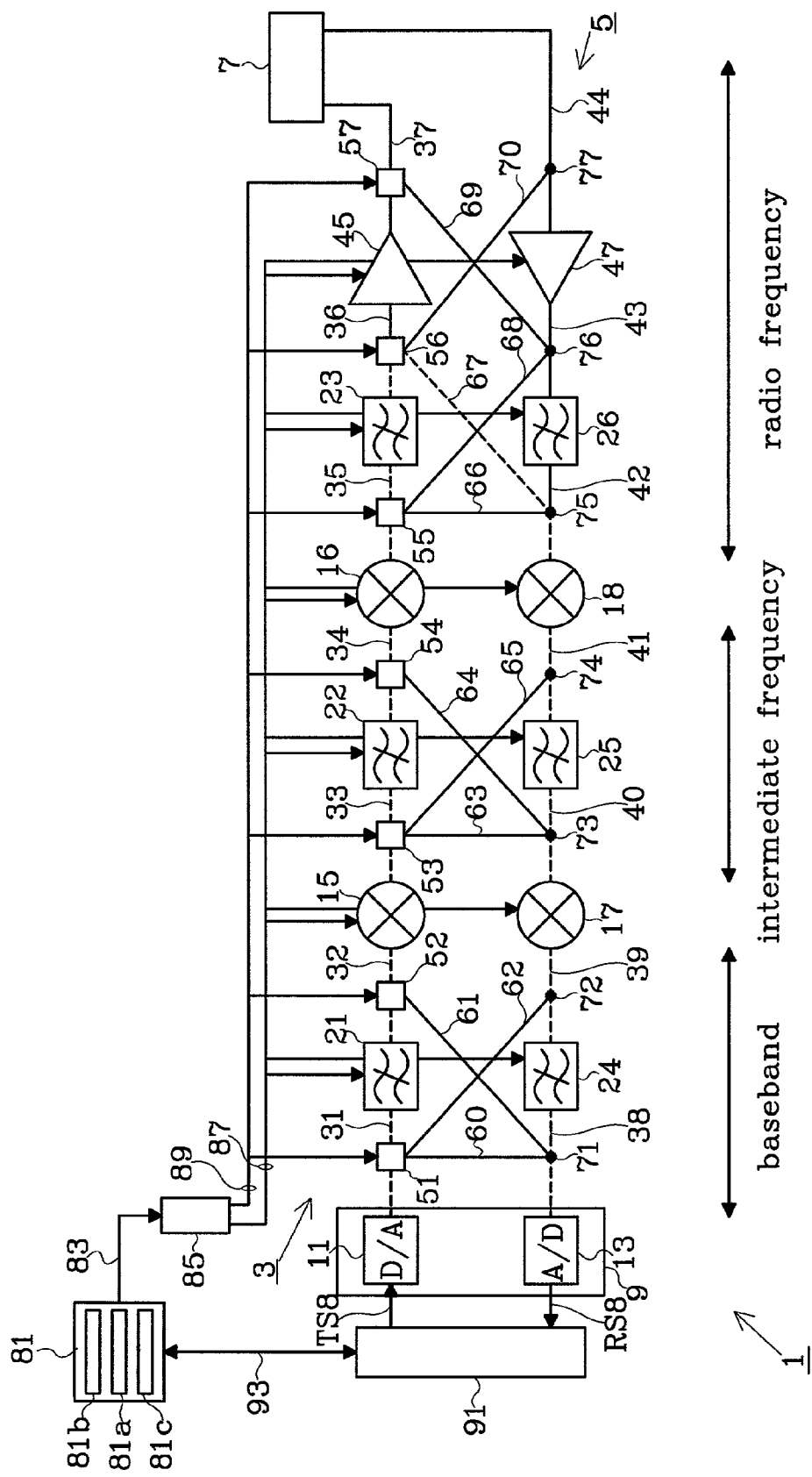

The switch 56 is set by the control unit 81 in a position in which switching takes place from the signal conductor 36 to a first end of the signal conductor 67. A second end of the signal conductor 67 is connected to the coupling point 75 on the signal conductor 42. Thus, a signal connection is established between the signal conductor 36 in the intermediate frequency stage of the transmitter chain 3 and the signal conductor 42 in the intermediate frequency stage of the receiver chain 5. In this regard, remaining switches 51–55 and 57 are set in their normal positions or states. There is thus obtained an eighth signal path from the baseband stage of the transmitter chain 3 to the baseband stage of the receiver chain 5. The eighth signal path is indicated in broken lines in FIG. 13. The signal processing unit 91 is adapted to generate an eighth test signal TS8 in response to a command from the control unit 81, said test signal TS8 being sent over the eighth signal path, subsequent to D/A-conversion in the digital interface 9. The eighth test signal TS8 is a multi-frequency signal that includes frequencies in the baseband range. In one preferred embodiment of the invention, the eighth test signal TS8 is a frequency sweep or scan. It is also preferred that the eighth test signal TS8 will enclose only one I-component or, only one Q-component. Calibration will not therewith be influenced by any phase and amplitude differences between I- and Q-channels. When the eighth test signal TS8 is sent over the eighth signal path, the signal processing unit 91 receives, via the A/D-converter 13, an eighth response signal RS8 corresponding to the eighth test signal TS8. The control unit 81 and the signal processing unit 91 are adapted to map the characteristic of the radio frequency filter 23, by comparing the eighth test signal TS8 with the eighth response signal RS8. In this regard, the information stored in the memory section 81*b* and relating to the characteristic of the baseband filters 21 and 24 and of the intermediate frequency filters 22 and 25 and also information relating to the signal influence on the digital interface 9 is used to correct the influence that these components 21, 24, 22, 25 and 9 have on the eighth test signal TS8 sent over the eighth signal path. This correction is effected by taking into account the signal influence exerted by the digital interface 9, the baseband filters 21 and 24 and the intermediate frequency filters 22 and 25, when making calculations in the signal processing unit 91 and in the control unit 81. Alternatively, the correction can be made from the outset, by correcting the eighth test signal TS8 for signal influence from the digital interface 9, the baseband filters 21 and 24 and the intermediate frequency filters 22 and 25. In a preferred embodiment, the signal processing unit 91 is adapted to Fourier transform the eighth test signal TS8 and the eighth response signal RS8. The characteristic of the radio frequency filter 23 is determined from the Fourier transforms. The measured characteristic is compared with the performance requirements stored in the memory section 81b. If the radio frequency filter 23 does not fulfil the pre-determined performance requirements, the control unit 81 functions to adjust the characteristic of the radio frequency filter 23, by re-setting one or more switches in the radio frequency filter 23. If necessary, this procedure is repeated until the performance of the radio frequency filter 23 is acceptable. The control unit 81 is adapted to store the measured characteristic of the radio frequency filter 23 in the memory section 81b, when the radio frequency filter 23 has attain an acceptable performance.

Figure 14:
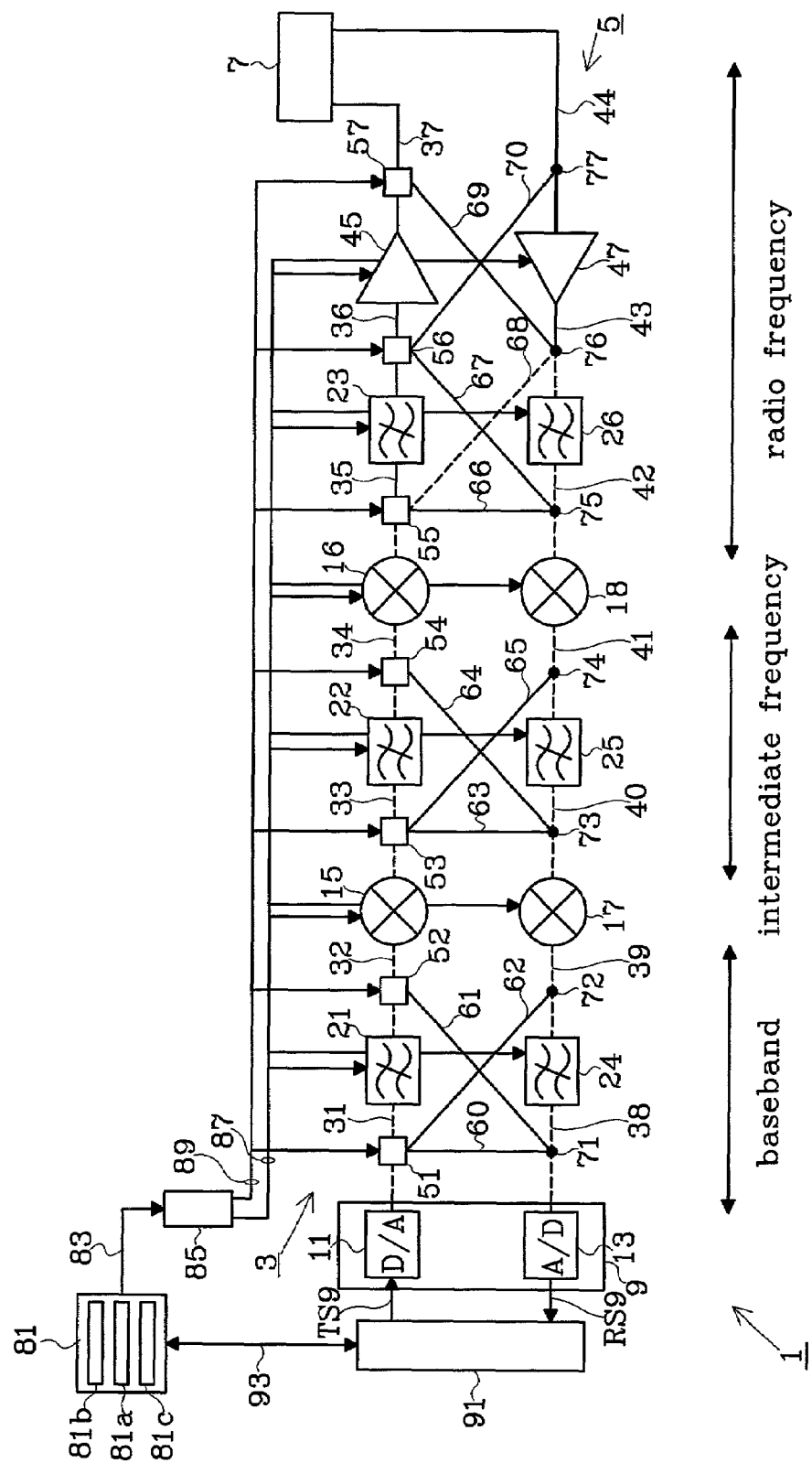

When the radio frequency filter 23 is calibrated, the control unit 81 functions to set the switch 55 to a position or state in which switching is effected from the signal conductor 3 to a first end of the signal conductor 68. A second end of the signal conductor 68 is connected to a coupling point 76 on the signal conductor 43. There is thus established a signal connection from the signal conductor 3 in the radio frequency stage of the transmitter chain 3 to the signal conductor 43 in the radio frequency stage of the receiver chain 5. In this regard, the remaining switches 51–54 and 56–57 are set in their normal positions or states. There is thus obtained a ninth signal path from the baseband stage of the transmitter chain 3 to the baseband stage of the receiver chain 5. The ninth signal path is indicated in broken lines in FIG. 14. The signal processing unit 91 is adapted to generate a ninth test signal TS9 in response to a command from the control unit 81, said ninth test signal being sent over the ninth signal path subsequent to D/A-conversion in the digital interface 9. The ninth test signal TS9 has the same properties as the eighth test signal TS8. When the ninth test signal TS9 is sent over the ninth signal path, the signal processing unit receives, via the A/D-converter 13, a ninth response signal RS9 corresponding to the ninth test signal TS9. The radio frequency filter 26 in the receiver chain 5 is calibrated by comparing the ninth test signal TS9 with the ninth response signal RS9. Calibration of the radio frequency filter 26 in the receiver chain 5 is effected, in this respect, in a manner corresponding to the calibration of the radio frequency filter 23 in the transmitter chain 3. When the radio frequency filter 26 is calibrated, the control unit 81 functions to store the measured characteristic of the radio frequency filter 26 in the memory section 81b.

Figure 15:
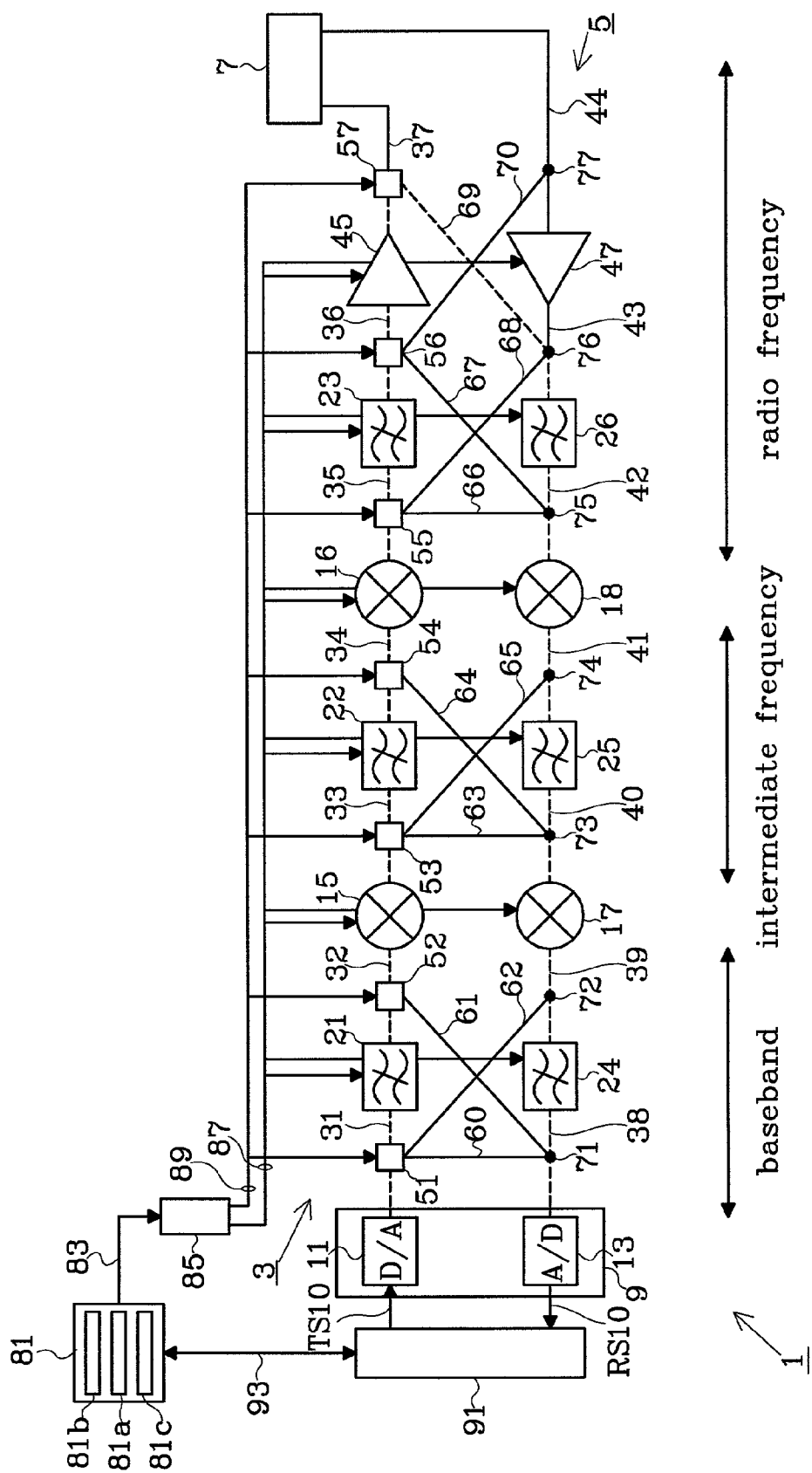

The method continues with the calibration of the transmitted amplifier 45. The switch 57 is set by the control unit 81 to a position or state in which switching is effected from the signal conductor 37 to a first end of the signal conductor 69. A second end of the signal conductor 69 is, in this respect, connected to the coupling point 76 of the signal conductor 43. There is thus established a signal connection from the signal conductor 37 in the radio frequency stage of the transmitter chain 3 to the signal conductor 43 in the radio frequency stage of the receiver chain 5. In this regard, the remaining switches 59–56 in the transceiver are set in their normal states or positions. There is thus obtained a tenth signal path from the baseband stage of the transmitter chain 3 to the baseband stage of the receiver chain 5. This tenth signal path is indicated in broken lines in FIG. 15. The signal processing unit 91 is adapted to generate a tenth test signal TS10 in response to a command from the control unit 81, this tenth test signal being sent over the tenth signal path, subsequent to D/A-conversion in the digital interface 9. A power spectrum relating to the tenth test signal TS10 will be evident from a diagram in FIG. 16a. The tenth test signal TS10 includes a first frequency component 161 having a frequency fa, and a second frequency component 163 having a frequency fb. The frequencies fa and fb are spaced from each other, although both lie in the baseband range. When the tenth test signal TS10 is sent over the tenth signal path, the signal processing unit 91 receives, via the A/D-converter 13, a tenth response signal RS10 corresponding to the tenth test signal TS10. A power spectrum relating to the tenth response signal RS10 is evident from a diagram in FIG. 16b. The tenth response signal RS10 includes a first frequency component 165 that corresponds to the first frequency component 161 of the tenth test signal TS10, and a second frequency component 167 that corresponds to the second frequency component 163 of the tenth test signal TS10. The tenth response signal RS10 also includes intermodulation products caused by non-linearities of the transmitter amplifier 45. The example illustrated in FIG. 15b shows a first intermodulation product 169 at the frequency $2fa-fb$, and a second intermodulation product 171 at the frequency $2fb-fa$. the signal processing unit 91 is adapted to Fourier transform the tenth test signal TS10 and the tenth response signal RS10. The signal processing unit 91 and the control unit 81 are also adapted to determine the magnitude of the intermodulation products 169 and 171 on the basis of the Fourier transforms. Data that states the allowed limit values of the magnitude of the intermodulation products 169 and 171 is stored in the memory section 81b. If the measured intermodulation products 169 and 171 exceed said limit values, or thresholds, the control unit 81 function to adjust the linearity of the transmitter amplifier 45 until the measured intermodulation products 169 and 171 lie beneath said limit values. In one preferred embodiment, the control unit 81 is adapted to adjust the linearity of the transmitter amplifier 45, by controlling the supply current to the transmitter amplifier 45. Alternatively, the linearity of the transmitter amplifier 45 is adjusted in some other way, for example by adjusting the input impedance of the transmitter amplifier 45.

Figure 17:
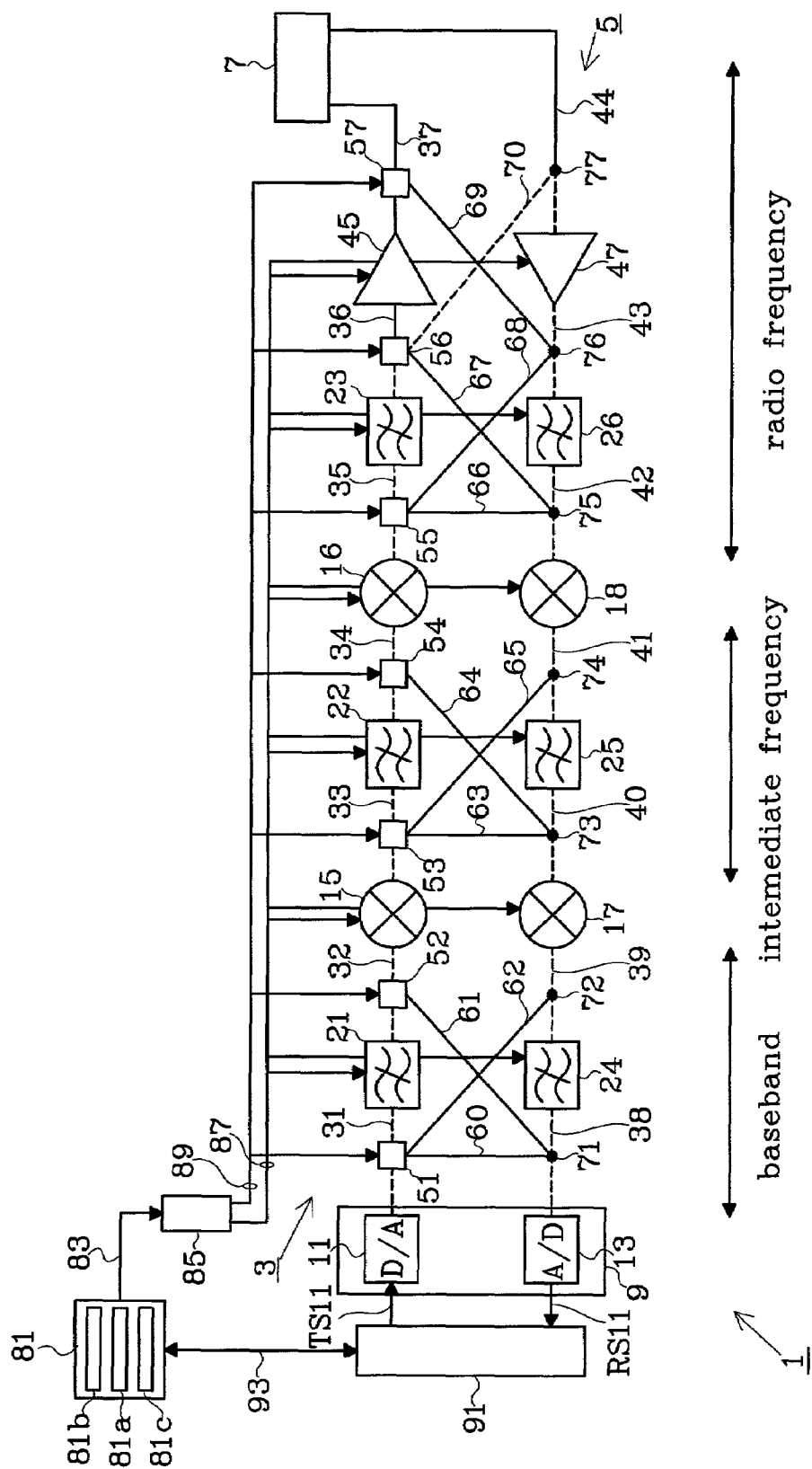
FIG. 17 illustrates the circuit of FIG. 1, where a signal path used in calibrating the transceiver is indicated in broken lines.

The method is terminated with calibration of the receiver amplifier 47. The switch 56 is set by the control unit 81 to a position or state in which switching takes place from the signal conductor 36 to a first end of the signal conductor 70. A second end of the signal conductor 70 is connected to a coupling point on the signal conductor 44. There is thus established a signal connection from the signal conductor 36 in the radio frequency state of the transmitter chain 3 to the signal conductor 44 in the radio frequency stage of the receiver chain 5. The remaining switches 51–55 and 57 are, in this respect, set in their normal states or positions. There is thus obtained an eleventh signal path from the baseband stage of the transmitter chain 3 to the baseband stage of the receiver chain 5. The eleventh signal path is indicated in broken lines in FIG. 17. The signal processing unit 91 is adapted to generate an eleventh test signal TS11 in response to a command from the control unit 81, this eleventh test signal being sent over the eleventh signal path subsequent to D/A-conversion in the digital interface 9. When the eleventh test signal TS11 is sent over the eleventh signal path, the signal processing unit 91 receives, via the A/D-converter 13, an eleventh response signal RS11 corresponding to the eleventh test signal TS11. The eleventh test signal TS11 has the same properties as the tenth test signal TS10, and the receiver amplifier 47 is calibrated in a manner corresponding to the calibration of the transmitter amplifier, as described above.

In summary, the aforedescribed calibration is effected more simply in accordance with the following. In the calibrating process, the switches 51–57 are controlled by the control unit 81 so that the signal conductor 60–70 will be activated successively in a pre-determined manner. Thus, there is established a sequence of signal connections between the transmitter chain 3 and the receiver chain 5. This results in a corresponding sequence of signal paths from the baseband stage in the transmitter chain 3 to the baseband stage in the receiver chain 5. Each such signal path includes at least one specific component that shall be calibrated with the use of the established signal path, wherein any further components in the signal path have already been calibrated with the use of area established signal paths. When calibrating said components, pre-determined test signals TS1–TS11 are sent over the signal paths and response signals RS1–RS11 are received at the baseband stage of the receiver chain in response to the transmitted test signals TS1–TS11. It is ascertained on the basis of the test signals TS1–TS11 and the response signals RS1–RS11 whether or not the components in the transceiver fulfil pre-determined performance requirements, said components being adjusted when they do not fulfil said performance requirements.

Although calibration according to the invention has been illustrated and described with reference to a transceiver circuit that includes three frequency stages (baseband, intermediate frequency and radio frequency), it will be understood that the invention is not restricted to just this number of frequency stages and that transceivers that include fewer or more frequency stages can be calibrated in accordance with the invention.

Figure 18:
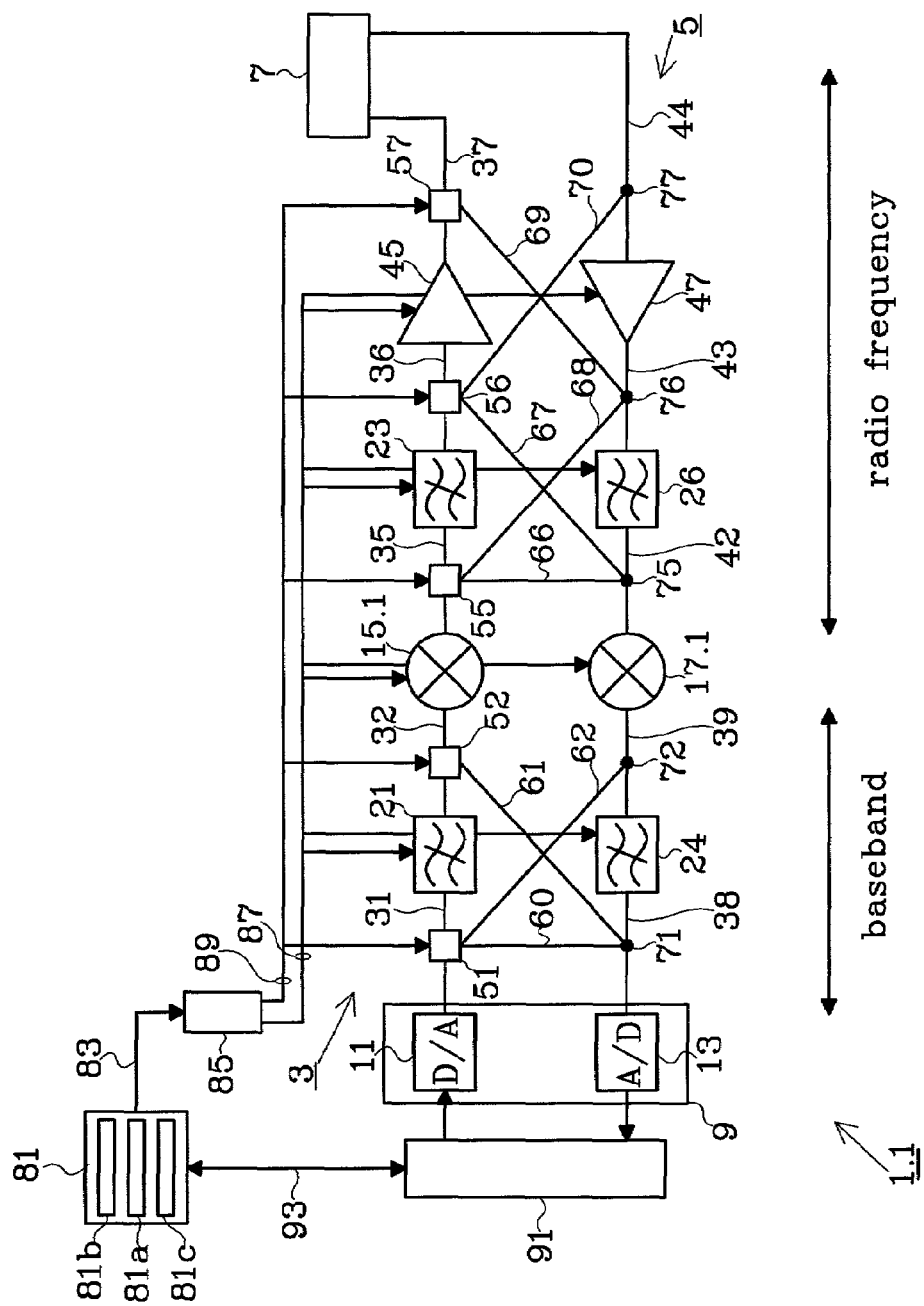
FIG. 18 is a further block diagram illustrating a circuit that includes a transceiver according to the present invention.

FIG. 18 is a block diagram of a circuit 1.1 that includes a transceiver. The circuit 1.1 is substantially identical to the circuit 1 shown in FIG. 1. Those features of the circuit 1.1 that find correspondence in the circuit 1 have therefore been identified with the same reference signs as those used to identify corresponding features in FIG. 1, for the sake of simplicity. The main difference between the circuit 1.1 and the circuit 1 and is that the intermediate frequency stages of the transceiver have been omitted in the circuit 1.1 and consequently the transceiver in FIG. 18 includes only baseband stages and radio frequency stages. The transceiver of the circuit 1.1 includes only two mixers 15.1 and 17.1, which are adapted for frequency transposition between the baseband stages and the radio frequency stages of the transceiver in the circuit 1.1. The mixers 15.1 and 17.1 are conveniently constructed in a manner corresponding to the mixers 15 and 17 shown in FIGS. 5 and 6, although in respect of the mixers 15.1 and 17.1 the frequencies of the oscillator signals LO are, of course, adapted for frequency transposition between the baseband stages and the radio frequency stages of the transceiver in the circuit 1.1.

Calibration of the transceiver in the circuit 1.1 is effected in a manner corresponding to that in which the transceiver in circuit 1 is calibrated.

Calibration in accordance with the invention can be carried out in the manufacture of the transceiver or subsequent to having installed the transceiver for use. This latter case has the advantage of enabling the transceiver to be kept constantly calibrated, regardless of temperature changes and other influences on the transceiver.

What is claimed is:

1. A method of calibrating components in a transceiver that comprises a transmitter chain and a receiver chain which include a pre-determined number of frequency stages and means for frequency transposition between said frequency stages, the method comprising:

successively establishing a sequence of signal connections between the frequency stages in the transmitter chain and the corresponding frequency stages in the receiver chain, thereby obtaining a sequence of signal paths from one baseband stage in the transmitter chain to a baseband stage in the receiver chain, wherein each signal path differs from the preceding signal paths by including one or more specific components that shall be calibrated and that are not included in any one of the preceding signal paths;

transmitting pre-determined test signals over each of said signal paths;

receiving response signals corresponding to the transmitted test signals;

establishing whether or not the performance or performances of the specific components for each signal path is/are acceptable in relation to the test signals and the response signals; and adjusting the specific component or specific components so as to obtain an acceptable performance when it is established that said performance is unacceptable.

2. The method according to claim 1, wherein a digital interface is connected to the baseband stage of the transceiver, and wherein the method is commenced by mapping the signal influence of the digital interface.

3. The method according to claim 1, wherein the transceiver includes at least one filter which constitutes the specific component in one of said signal paths.

4. The method according to claim 3, wherein the test signal used in the calibration of the filter is a multi-frequency signal that has a predetermined frequency range.

5. The method according to claim 4, wherein the multi-frequency signal is a frequency sweep.

6. The method according to claim 4, wherein the multi-frequency signal includes solely one I-component or solely one Q-component.

7. The method according to claim 1, wherein the transceiver includes at least one first pair of sideband suppressing mixers which constitute the specific components in one of the signal paths, wherein the method includes setting at least one of the mixers so that the associated response signal will show undesired sidebands and wherein adjustment of said first pair of sideband suppressing mixers includes adjustment of said mixers so as to suppress undesired sidebands to a predetermined extent.

8. The method according to claim 7, wherein the test signal used in the calibration of said first pair of sideband suppressing mixers is a single frequency signal.

9. The method according to claim 1, wherein the transceiver includes at least one amplifier which constitutes the specific components in one of said signal paths, wherein the test signal used in the calibration of said amplifier includes at least two frequency components, wherein intermodulation products of the frequency components are identified on the basis of the corresponding response signal, and wherein adjustment of the amplifier includes adjustment of the linearity of the amplifier, so that the identified intermodulation products will lie below pre-determined limit values.

10. The method according to claim 9, wherein the linearity of the amplifier is adjusted by controlling the supply of current to the amplifier.

11. The method according to claim 9, wherein the linearity of the amplifier is adjusted by controlling an input impedance of the amplifier.

12. A transceiver circuit comprising:
- a transmitter chain and a receiver chain that include a pre-determined number of frequency stages and means for frequency transposition between the frequency stages and;
- means for establishing successively a sequence of signal connections between the frequency stages in the transmitter chain and the corresponding frequency stages in the receiver chain, thereby obtaining a sequence of signal paths from a baseband stage in the transmitter chain to a baseband stage in the receiver chain, wherein each signal path differs from the preceding paths by virtue of including one or more specific components that are not included in any one of the preceding signal paths.

13. The transceiver circuit according to claim 12, further comprising:
- means for transmitting pre-determined test signals over each of said signal paths;
- means for receiving response signals corresponding to the transmitted test signals;
- means for establishing whether or not the performance of the component or components specific to each signal path is acceptable or not on the basis of the test signals and the response signals; and
- means for adjusting the specific component or components so as to obtain acceptable performance when it is established that component performance is not acceptable.

* * * * *